US007280988B2

(12) United States Patent
Helsper et al.

(10) Patent No.: US 7,280,988 B2
(45) Date of Patent: Oct. 9, 2007

(54) METHOD AND SYSTEM FOR ANALYZING AND PREDICTING THE PERFORMANCE OF COMPUTER NETWORK USING TIME SERIES MEASUREMENTS

(75) Inventors: David Helsper, Marietta, GA (US); Jean-Francois Huard, New York, NY (US); David Homoki, Marietta, GA (US); Amanda Rasmussen, Atlanta, GA (US); Robert Jannarone, San Diego, CA (US)

(73) Assignee: Netuitive, Inc., Reston, VA (US)

( * ) Notice: Subject to any disclaimer, the term of this patent is extended or adjusted under 35 U.S.C. 154(b) by 479 days.

(21) Appl. No.: 10/324,641

(22) Filed: Dec. 19, 2002

(65) Prior Publication Data

US 2003/0139905 A1 Jul. 24, 2003

Related U.S. Application Data

(60) Provisional application No. 60/342,312, filed on Dec. 19, 2001.

(51) Int. Cl.
*G06E 1/00* (2006.01)
(52) U.S. Cl. ............................ 706/26; 706/22; 706/21; 709/224; 702/182; 702/186
(58) Field of Classification Search .................. 706/26, 706/22, 21; 709/24; 702/182, 186
See application file for complete search history.

(56) References Cited

U.S. PATENT DOCUMENTS

| | | | |
|---|---|---|---|
| 5,239,594 A | 8/1993 | Yoda | 382/158 |
| 5,444,819 A * | 8/1995 | Negishi | 706/21 |
| 5,461,699 A * | 10/1995 | Arbabi et al. | 706/21 |
| 5,727,128 A | 3/1998 | Morrison | 706/45 |
| 5,748,508 A | 5/1998 | Baleanu | |

(Continued)

FOREIGN PATENT DOCUMENTS

EP 89118487.1 10/1989

(Continued)

OTHER PUBLICATIONS

"Combining Artificial Neural Networks and Statistics for Stock Market Forecasting", Wu S., Lu, R., Proceedings of the 1993 ACM conference on Computer science, Mar. 1993.*

(Continued)

*Primary Examiner*—David Vincent
*Assistant Examiner*—Mai T. Tran
(74) *Attorney, Agent, or Firm*—Michael J. Mehrman; Mehrman Law Office PC

(57) ABSTRACT

A monitoring system including a baseline model that automatically captures and models normal system behavior, a correlation model that employs multivariate autoregression analysis to detect abnormal system behavior, and an alarm service that weights and scores a variety of alerts to determine an alarm status and implement appropriate response actions. The baseline model decomposes the input variables into a number of components representing relatively predictable behaviors so that the erratic component e(t) may be isolated for further processing. These components include a global trend component, a cyclical component, and a seasonal component. Modeling and continually updating these components separately permits a more accurate identification of the erratic component of the input variable, which typically reflects abnormal patterns when they occur.

43 Claims, 11 Drawing Sheets

U.S. PATENT DOCUMENTS

| | | | |
|---|---|---|---|
| 5,748,851 A * | 5/1998 | Iokibe et al. | 706/58 |
| 5,953,707 A * | 9/1999 | Huang et al. | 705/10 |
| 6,182,022 B1 | 1/2001 | Mayle et al. | |
| 6,205,431 B1 * | 3/2001 | Willemain et al. | 705/10 |
| 6,208,953 B1 | 3/2001 | Milek | 703/7 |
| 6,289,330 B1 | 9/2001 | Jannarone | 706/26 |
| 6,327,677 B1 | 12/2001 | Garg | 714/37 |
| 6,792,399 B1 | 9/2004 | Phillips | 705/36 R |
| 6,876,988 B2 | 4/2005 | Helsper | 706/21 |
| 6,928,398 B1 * | 8/2005 | Fang et al. | 703/2 |
| 2001/0034637 A1 | 10/2001 | Lin et al. | 705/10 |
| 2003/0036890 A1 | 2/2003 | Billet | 703/2 |

FOREIGN PATENT DOCUMENTS

| | | |
|---|---|---|
| EP | 92114059.6 | 8/1992 |
| WO | WO98/22885 | 5/1998 |

OTHER PUBLICATIONS

"Time series properties of an artificial stock market", LeBaron B., Arthur W. B., Palmer R., Journal of Economic Dynamics and Control, Nov. 20, 1998.*

"Time series Models for Internet Data Traffic", You, C., Chandra, K.; Local Computer Networks, 1999, pp. 164-171.*

Autocorrelation, definition from Wikipedia, one page.*

Decorrelation, definition from Wikipeidia, one page.*

Woodward—5009 Fault-tolerant control Product Specification 85578F.

* cited by examiner

METHOD AND SYSTEM FOR ANALYZING AND PREDICTING THE PERFORMANCE OF COMPUTER NETWORK USING TIME SERIES MEASUREMENTS

REFERENCED TO RELATED APPLICATIONS

This application claims priority to commonly-owned U.S. Provisional Patent Application Ser. No. 60/342,312 filed on Dec. 19, 2001, which is hereby incorporated by reference. This application also incorporates by reference the disclosures of the following commonly-owned patents and patent applications: U.S. Pat. Nos. 5,835,902; 6,216,119; 6,289,330; 6,876,988; and co-pending U.S. patent application Ser. No. 10/165,232.

TECHNICAL FIELD

This invention relates to computerized monitoring and modeling systems and, more specifically, relates to a method and system for modeling, estimating, predicting, and detecting abnormal behavior in systems, such as complex computer networks, servers, and other computer-based systems.

BACKGROUND OF THE INVENTION

Many systems, and in particular complex computer networks, exhibit operational patterns that include broad trends that evolve gradually, cyclical components that fluctuate widely on a largely predictable basis, seasonal or scheduled events that result in even wider fluctuations that occur according to known or detectable schedules, and other less predictable or erratic components. In particular, abnormal system behavior indicative of system problems, such as those caused by individual component overloads and localized equipment or software failures, tend to exhibit relatively erratic operational patterns that are often smaller than the wide fluctuations that occur in the normal usage patterns. These abnormal operational patterns, which are superimposed on top of normal operational patterns that fluctuate widely and change continuously over time, can be difficult to reliably detect.

For this reason, systems analysts have long been engaged in a continuing challenge to develop increasingly effective ways to reliably detect real abnormal system behavior indicative of system problems while avoiding false alarms based on the normal operational patterns. A fundamental difficulty in this challenge arises from the fact that abnormal system behavior can sometimes be masked by normal operational patterns, which causes real system problems to go undetected. Conversely, normal operational patterns can sometimes be misdiagnosed as abnormal system behavior indicative of system problems, which cause false alarms.

To combat this two-sided challenge, systems analysts often attempt to "tune" error detection systems to reliably identify real system problems while avoiding an unacceptable level of false alarms. Consistently acceptable tuning is not always possible because loosening the alarm thresholds tends to increase the occurrence of real problems that go undetected, whereas tightening the alarm thresholds tends to increase the occurrence of false alarms. In addition, it has been observed that alarm thresholds should be adjustable to conform to changes in the normal system operational pattern. For example, low alarm thresholds may be appropriate during low system usage periods, whereas much larger alarm thresholds may be appropriate for higher system usage periods.

Accordingly, systems analysts have attempted to design monitoring systems with alarm thresholds that track the expected normal operational pattern of a monitored system. In particular, historical usage patterns for the monitored system may be analyzed to detect normal usage patterns, and deterministic functions may then be "fit" to the historical pattern to develop a predictive function for the normal operational pattern of the system. The alarm thresholds may then be set based on the predictive estimate of the normal operational pattern of the system.

These types of predictive monitoring systems exhibit two major drawbacks. First, historical data is not always available for the monitored system and, even when it is available, the task of developing a predictive function for the normal operational pattern of the system based on historical usage patterns is technically challenging, expensive, and time consuming. Second, the normal behavior of complex computer networks tends to change over time, which periodically renders the historically-determined predictive functions obsolete. Combating this problem requires periodic updating of the historical analysis, which adds further cost and complexity to the monitoring system. Moreover, unpredictable changes in the behavior of the monitored system can still occur, resulting in systemic failure of the monitoring system.

Still searching for reliable solutions to the system monitoring challenge, analysts have implemented systems that automatically update their predictive functions on an on-going basis. However, these types of systems may encounter problems related to the sensitivity of the updating process. For example, a predictive function that is updated too quickly can misdiagnose a real system problem as a developing change in the normal system behavior, whereas a predictive function that is updated too slowly can produce false alarms based on legitimate changes in the normal system behavior.

Moreover, the opportunity for truly adaptive monitoring systems to take full advantage of observable patterns in the normal behavior of complex computer networks remains largely unmet for a variety of reasons, including the inherent difficulty of the underlying problem, high data rates in the monitored systems, fast and highly fluctuating changes in normal system behavior, high levels of system complexity, and high levels of sophistication required in the monitoring systems themselves.

Therefore, a continuing need exists for more effective methods and systems for modeling, estimating, predicting and detecting abnormal behavior in computer networks that exhibit unpredictable abnormal events superimposed on top of rapidly fluctuating and continuously changing normally operational patterns.

SUMMARY OF THE INVENTION

The present invention meets the needs described above for modeling, estimating, predicting, and detecting abnormal behavior in systems, such as complex computer networks. Although this system will be referred to as a "monitoring system" for descriptive convenience, it should be understood that it may perform additional functions, such as predicting abnormal system behavior, activating alerts and alarms based on detected or predicted system problems, implementing response actions to detected system problems, accumulating descriptive statistics, implementing user-defined system tuning, and so forth. The monitoring system typically includes a baseline model that automatically captures and models normal system behavior, a correlation model that employs multivariate autoregression analysis to detect abnormal system behavior, and an alarm service that weights and scores a variety of alerts to determine alarm status and appropriate response actions. Individually and in combination, these features represent significant advances in the field of network monitoring and modeling systems that overcome a number of persistent shortcomings in prior monitoring systems More specifically, the baseline model automatically captures and updates signatures for multiple input variables representing normal system operation on an on-going basis. Although historical data may be used to initialize the system, this step is optional, and the system may "bootstrap" itself into a working model without the need for extensive analysis of historical data. More importantly, the monitoring system automatically updates the baseline model for each set of data inputs (i.e., each time trial) to continually refine the model while detecting and adapting to changes in the normal system operation that occur over time. The baseline model also tracks and models each input variable individually, and decomposes the signature for each input variable into components that track different characteristics of the variable. For example, each input variable may be modeled by a global trend component, a cyclical component, and a seasonal component. Modeling and continually updating these components separately permits a more accurate identification of the erratic component of the input variable, which typically reflects abnormal patterns when they occur. This improved modeling accuracy allows the system to implement tighter alarm thresholds while maintaining acceptable levels of false alarms.

Further, the historical usage pattern for each input variable is represented by a time-based baseline mean and variance, which are in turn based on combinations of the means and variances for the components making up the baseline. This obviates the need for a large database of historical analysis and periodic reevaluation of that historical data. In addition, the time-based baseline means and variances are updated in a weighted manner that gives accentuated relevance to the measurement received during the most recent time trial, which allows the model to adapt appropriately to changes in the normal operational pattern. Moreover, the weighting parameters are typically implemented through user-defined inputs, which allows the user to tune this aspect of the baseline model for each input variable individually.

The correlation model is defined by a "two cycle" use of a connection weight matrix to compute expected values of the erratic components of the input variables for current and future time trials, followed by updating the connection weight matrix to reflect learning from the current time trial. Specifically, for a current trial, the correlation model receives input values, computes expected output values for the current time trial (i.e., imputed estimates), computes expected output values for future time trials (i.e., forecast estimates), and updates the learned parameters expressed in the connection weight matrix. In this two cycle process, monitoring and forecasting using current data and a historically determined connection weight matrix represents the first cycle, and updating the connection weight matrix to reflect learning from the current data represents the second cycle. This two cycle process is repeated for each time trial to implement monitoring, forecasting and learning concurrently as the correlation model operates over a number of time trials.

In the correlation model, the monitoring function involves receiving erratic components for the current time trial and computing imputed estimates for those same erratic components for the current time trial based on the actual data received for the current time trial and learned parameters that reflect observed covariance relationships among the erratic components based on previous time trials. This aspect of the correlation model recognizes and takes advantage of the fact that one input variable may vary instantaneously as a function of other variables. For example, consider an instance in which a network response time is directly affected by other monitored variables, including the quantity of network traffic, the number of users accessing the application, the availability of buffer space, and the cache memory level. Therefore, the expected value of the application response time necessarily varies instantaneously with changes in these other variables. The correlation model properly models this relationship by using real-time data (i.e., measurements for the current time trial) and the learned parameters to compute the imputed estimates for the current time trial. This type of modeling accuracy is not possible with systems that rely on historical data alone to compute the predictive indicators of system performance, and cannot be implemented without the use of a multivariate correlation model.

The alarm service computes imputed estimate alerts and forecast estimate alerts for each input individually. Typically, these alerts are based on threshold values based on user-defined parameters, which allows the user to tune this aspect of the alarm service for each input variable individually, and for imputed estimate alerts and forecast estimate alerts separately. In addition, the alarm service includes an alarm generator that accumulates and weights the various alerts generated for the various input variables and computes an alarm score based on the overall alert condition. This avoids false alarms from isolated outliers or data errors. These and other advantages of the invention will be readily appreciated by those skilled in the art.

Generally described, the present invention may be implemented as a monitoring system deployed on a host computer system, which may be local or remote, or it may be expressed in computer-executable instructions stored on a computer storage medium. The monitoring system continually receives measurements defining signatures for a plurality of input variables reflecting the behavior of a monitored system, such as a computer network. Each signature includes a time series of measurements including historical measurements for past time trials and a current measurement for a current time trial. The monitoring system also computes a time-based baseline mean and variance for a selected input variable based on the historical measurements for the selected input variable. The monitoring system then computes an erratic component for the selected input variable by comparing the measurement for the selected input value for the current time trial to the time-based baseline mean for the selected input variable.

Typically, the monitoring system then computes an imputed estimate, a forecast estimate, or both. In particular, the monitoring system may compute an imputed estimate for the selected input variable based on erratic components computed for other input variables for the current time trial and learned parameters reflecting observed relationships between the erratic component for the selected input variable and the erratic components for the other input variables. The monitoring system then determines an alert status for the imputed estimate based on the imputed estimate and the erratic component for the input variable for the current time trial. Alternatively or additionally, the monitoring system may compute a forecast estimate for the selected input variable based on erratic components computed for other input variables and learned parameters reflecting observed relationships between the erratic component for the selected input variable and the erratic components for the other input variables. The monitoring system then determines an alert status for the forecast estimate.

The monitoring system also updates the time-based baseline mean and variance for the selected input variable based on the measurement received for the selected input value for the current time trial. In general, the process described above may be implemented for a single input variable or it may be repeated for multiple input variables. Further, the forecast estimate process is usually implemented for multiple future forecasts, for example to produce short, medium or long range operational forecasts. Of course, the process is also repeated for multiple current time trials as new data arrives, and the monitoring system runs in an operational mode to provide the alarm service while it refines and adapts the baseline model and correlation models.

To provide the alarm service, the monitoring system typically computes a confidence value for the imputed estimate, a threshold value for the imputed estimate based on the confidence value, and an imputed estimate alert value reflecting a difference between the imputed estimate and the erratic component for the selected input variable to the threshold value for the imputed estimate. The monitoring system may then determine an alert status for the imputed estimate by comparing the alert value to the threshold value for the imputed estimate. Specifically, the confidence value for the imputed estimate may be based on a standard error associated with the imputed estimate, and the threshold value for the imputed estimate may be based on the standard error and a user-defined configuration parameter. Further, the monitoring system may also compute a threshold value for the forecast estimate and determine an alert status for the forecast estimate by comparing the forecast estimate to the threshold value. For this computation, the threshold value may be based on the time-based baseline variance for the selected input variable and a user-defined configuration parameter.

In another aspect of the invention, the monitoring system computes the time-based baseline mean and variance for the selected input variable by decomposing the signature for the input variable into components and computing a mean and variance for each component. The monitoring system then combines the means for the components to obtain the time-based baseline mean, and also combines the variances for the components to obtain the time-based baseline variance. More specifically, the monitoring system typically decomposes the signature for the input variable into components by defining a repeating cycle for the historical measurements. The monitoring system then divides the cycle into a number of contiguous time periods or "time slices" such that each cycle includes a similar set of time periods, each having corresponding time indices within each cycle.

Typically the monitoring system then computes a global trend component for the selected input variable reflecting measurements received for the selected input variable for temporally contiguous time indices. Also typically, the monitoring system computes a cyclical component for the selected input variable reflecting data accumulated across multiple cycles for each time index. This allows the monitoring system to update the time-based baseline mean by computing an updated mean for each component based on a weighted sum including the baseline mean for the component and the measurement received for the selected input variable for the current time trial, and summing the updated means for the components. Similarly, the monitoring system computes the updated time-based baseline variance by computing an updated variance for each component based on a weighted sum including the baseline variance for the component and the measurement received for the selected input variable for the current time trial, and summing the updated variances for the components.

In another aspect, the monitoring system receives imputed estimate and forecast estimate alerts corresponding to multiple input measurements, weights the alerts, and computes an alert score based on the weighted alerts. The monitoring system then determines whether to activate an alarm condition based on the alert score.

In view of the foregoing, it will be appreciated that the present invention greatly improves upon preexisting methods and systems for modeling, estimating, predicting and detecting abnormal behavior in computer networks, servers and other computer-based systems that exhibit unpredictable abnormal events superimposed on top of rapidly fluctuating and continuously changing normal operational patterns. The specific techniques and structures employed by the invention to improve over the drawbacks of prior monitoring systems to accomplish the advantages described above will become apparent from the following detailed description of the embodiments of the invention and the appended drawings and claims.

DETAILED DESCRIPTION OF THE EMBODIMENTS

Figure 1:
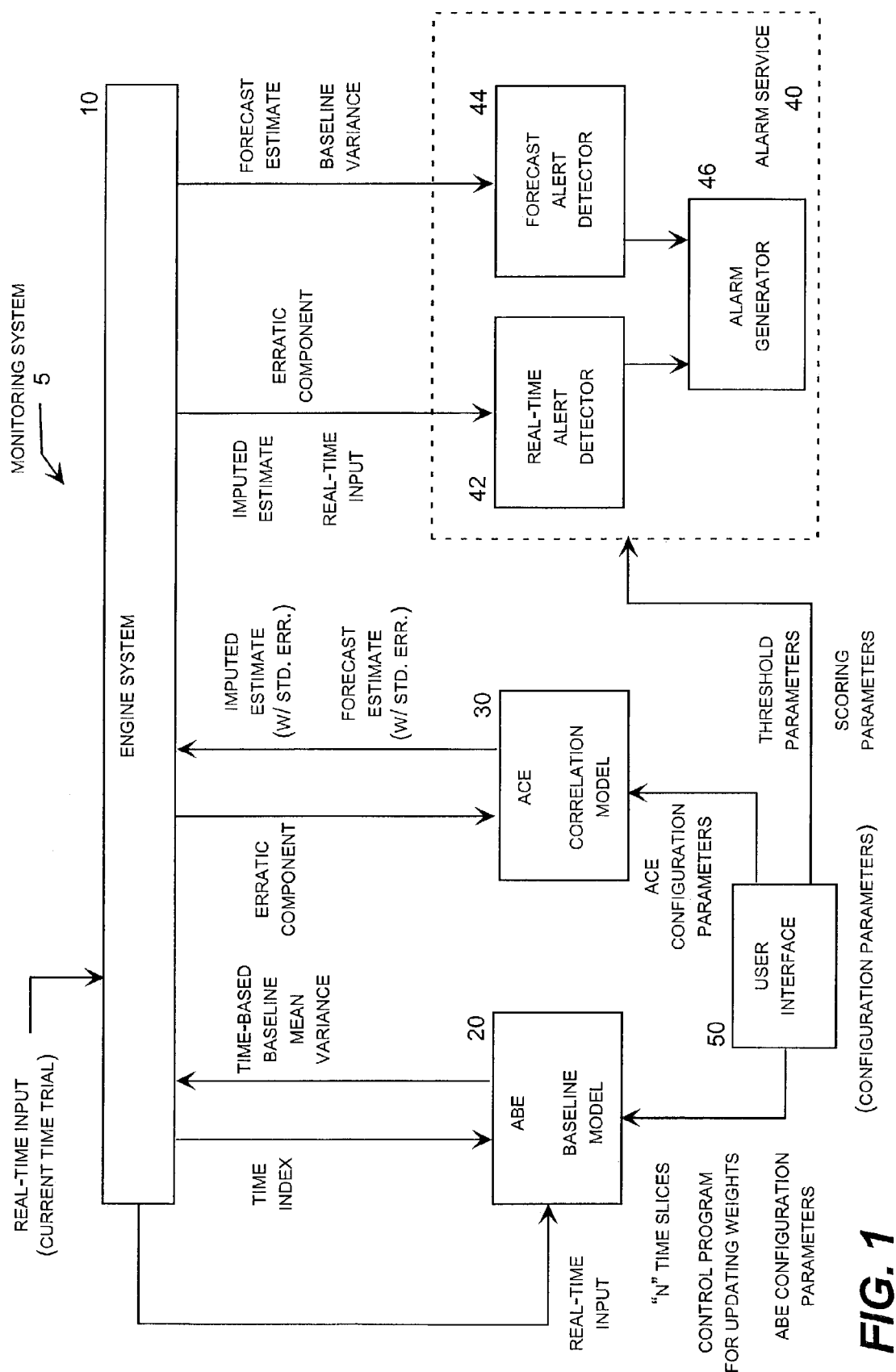
FIG. 1 is a functional block diagram illustrating the structure and operation of a monitoring system configured to implement the present invention.

The present invention may be embodied in a system intended to address the task of modeling, estimating, predicting and detecting abnormal behavior in systems that exhibit unpredictable abnormal events superimposed on top of rapidly fluctuating and continuously changing normally operational patterns. As noted above, this system will be referred to as a "monitoring system" for descriptive convenience. However, it should be understood that it may perform additional functions, such as predicting abnormal system behavior, activating alerts and alarms based on detected or predicted system problems, implementing response actions to detected system problems, accumulating descriptive statistics, implementing user-defined system tuning, and so forth.

Although the embodiments of the invention described below are tailored to operate as a monitoring system for a complex computer network or server system, it should be understood that the monitoring system may be used for any of a wide range of systems, such as industrial processes, financial systems, electric power systems, aviation control systems, and any other type of system for which one or more input variables may be measured for monitoring and control purposes. In particular, the monitoring system is intended to provide an alarm service for systems, such as computer networks and server systems, exhibiting erratic motions that contain repeating characteristics, such as global trends, cyclical variations, and seasonal variations. The monitoring system learns these behaviors by capturing the signatures of input variables measured for the monitored system and adapting the signatures over time, improving their accuracy and automatically learning changes in behavior as they occur. Because the monitoring system captures the signatures based on an analysis of received data over a time frame, it bypasses the typical modeling stage of the commonly used methods of analysis. That is, the present modeling system captures and continually updates the monitored system's signatures, and uses these captures signatures to model the system rather than relying on deterministic curve fitting or other classical types of data analysis, such as time series analysis and statistical analysis.

It also should be understood that other elements may be deployed as part of the monitoring system, and that any of the components shown as part of the monitoring system may be deployed as part of an integrated system or as separate components in separate enclosures. For example, any of the components of the monitoring system may be deployed in a combined enclosure, or they may be deployed in separate enclosures, or they may be combined in any manner suitable to a particular application. In addition, each element may be located in a single physical location, or it may be distributed in a distributed computing environment. For example, the input variables may be provided from the monitored system to the monitoring system, and the alarm service output may be delivered from the monitoring system to the monitored system, with the internal computations of the monitoring system being implemented on a remote computer. In this manner, a single monitoring system computer may be used to support multiple monitoring applications. Alternatively, a stand-alone monitoring system may be deployed at the location of the monitored system. Of course, many other configurations may be used to implement the invention.

Turning now to the drawings, in which the same element numeral refer to similar components in the several figures, FIG. 1 is a functional block diagram illustrating the structure and operation of a monitoring system 5 configured to implement the present invention. Generally, the monitoring system 5 includes an engine system 10, an adaptive baseline model (ABE) 20, an adaptive correlation engine (ACE) 30, and an alarm service 40, which includes a real-time alert detector 42, a forecast alert detector 44, and an alarm generator 46. Although these components are typically deployed as separate computer objects, they may be further subdivided or combined with each other or other objects in any manner suitable for a particular application. In addition, any of the components may be deployed locally or remotely, and may be combined with other functions and services.

The engine system 10 functions as a coordinator for the other system elements and manages the overall system activity during the running operation of the monitoring system 5. In particular, the engine system 10 receives a set of measurements defining input variables for each time trial in a continually recurring set of time trials, which is represented by the input variable Y(t). Although the input variables typically include a vector containing multiple measurements, each input variable may be handled in the same manner. Therefore, for descriptive convenience, the methodology of the monitoring system is described for the representative input variable Y(t), which is also referred to as the "subject input variable," to distinguish it from the other input variables. However, it should be understood that this same methodology applies to all of the input variables in a multi-variable vector represented by Y(t).

That is, each input of several input variables is treated as the "subject input variable" for its own processing, and all of these input variables are processed for each time trial, typically simultaneously, although they could be processed sequentially in some order. For this reason, the methodology is described below as applicable to a single "subject input variable" Y(t), and it is to be understood that multiple input variables are typically processed in a similar manner, either simultaneously or in some order. In addition, the engine system 10 may also receive additional input variables that are not processed as signatures, such as status indicators and configuration parameters. However, these variables may be ignored for the purpose of describing the inventive aspects of the present monitoring system.

The operation of the engine system 10, as described below, is typically repeated for each time trial in a continual time series of time trials. In general, the engine system 10 continually receives measurement for the representative input variable Y(t), to define a time-based signature of measured values for that variable. In this time-based series, the time units are referred to as the "time index," which typically begins with time index "t=1" and sequentially run through "n" successive time trials for a repeating cycle.

The ABE 20 maintains a time-based baseline model for the representative input variable Y(t). More specifically, the ABE 20 defines a repeating cycle for the input variable Y(t) and computes a time-based mean and variance for each time period or "time slice" of the cycle. In other words, the ABE 20 defines a time-based baseline model for the input variable Y(t) that includes a time-based baseline mean and variance for each time index in the cycle. The cycle is typically defined by a user input parameter specifying a number of time slices "n" in the cycle. This parameter together with the inherent frequency of the input variable Y(t) defines a repeating cycle, which is typically the same for all of the input variables.

Further, the time-based baseline model for the input variable Y(t) is typically composed from a number of components, which the ABE 20 tracks individually. In particular, the signature for the input variable Y(t) may typically be decomposed into a global trend component G(t), a cyclical component C(t), a seasonal or scheduled component S(t), and an erratic component e(t), as shown in the decomposition equation 904 shown in FIG. 9A. Nevertheless, it should be understood that these particular components are merely illustrative, and that the ABE 20 may track additional components, different components, only a subset of these components, as may be appropriate for a particular application. However, the illustrated set of components included in the decomposition equation 904 [i.e., Y(t)=G(t)+C(t)+S(t)+e(t)] have been found to be well suited to a monitoring system for a complex computer network or server system.

Figure 9:
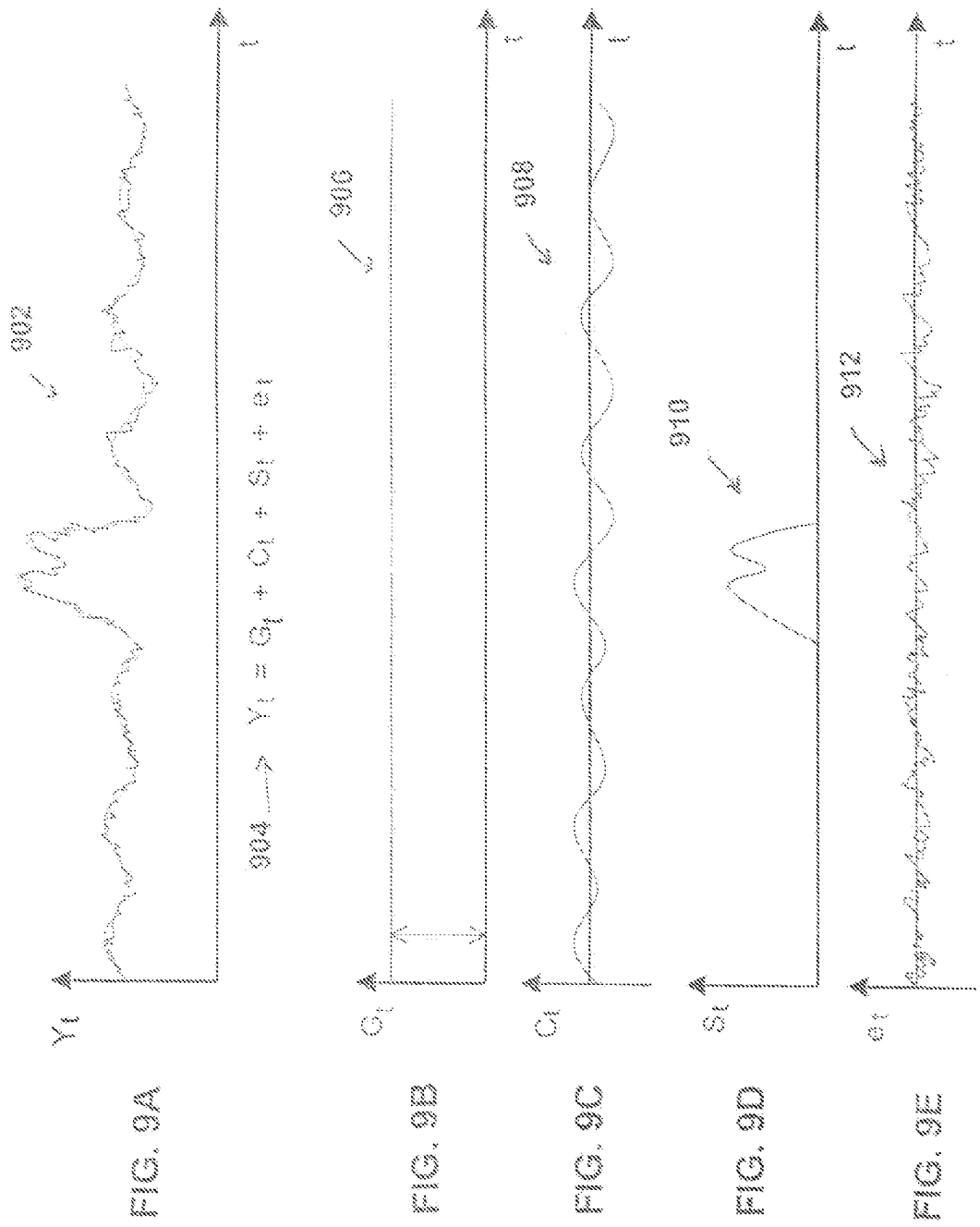
FIG. 9A is graph illustrating a typical signature of an input variable for the monitoring system.
FIG. 9B is graph illustrating a global trend component of the input variable signature shown in FIG. 9A.
FIG. 9C is graph illustrating a cyclical component of the input variable signature shown in FIG. 9A.
FIG. 9D is graph illustrating a seasonal or scheduled component of the input variable signature shown in FIG. 9A.
FIG. 9E is graph illustrating an erratic component of the input variable signature shown in FIG. 9A.

More specifically, FIGS. 9A-E illustrate the decomposition of the representative input variable Y(t) into an illustrative set of components including the global trend component G(t), the cyclical component C(t), the seasonal or scheduled component S(t), and the erratic component e(t). Specifically, FIG. 9A is a time graph 902 illustrating a typical signature for the representative input variable Y(t), which is shown as a continuous function that may be sampled to obtain a time series for the input variable Y(t). Further, although the signature 902 for the input variable Y(t) is shown as a continuous function, it should be understood that the signature for input variable Y(t) may be received as a time series of contiguous discrete points corresponding to the measurements received by the engine system 10 for the input variable Y(t) for each in a continual series of time periods or time slices. In this case, sampling is not required.

FIG. 9B is a graph illustrating the global trend component 906, which is referred to as G(t). The global trend component G(t) is typically captured by computing a temporally contiguous running mean and variance for the input variable Y(t). That is, referring to FIG. 9A, the global trend component G(t) may be captured by computing a running mean and variance "horizontally" for a series of temporally contiguous data points forming the signature 902 of the input variable Y(t). Horizontal computation refers generally to including in the computation a number of temporally contiguous data points across the graph 902 shown in FIG. 9A horizontally from left to right to obtain the running mean and variance for that variable 904, which is shown in FIG. 9B. This may also be thought of as the "DC offset" or the portion of the input variable Y(t) that has a non-zero average over time. A running variance is also computed for the time series defining input variable Y(t) in a similar horizontal manner. The terms "running mean and variance" generally refer to a weighted mean and variance that is continually updated as new data values are received for new time trials.

In other words, the values forming the time series defining the signature for the representative input variable Y(t) are typically weighted to give accentuated significance to more recent data. For example, a decreasing series of learning blocks may be used to weight the data points of the time series Y(t) when computing the running mean and variance. In particular, the ABE 20 may represent all of the historical data for the input variable Y(t) as a single mean and variance pair, or as several mean and variance pairs representing different historical blocks, which may then be weighted and factored in with the newly received input data value for each current time trial in the continuing time series. As will be obvious to someone skilled in the art, methods exist for generating weighting factors that allow the computation of running means and variances without the need to maintain any historical input data; i.e., only the current mean and variance and input measurement for the current time trial are needed to update the running mean and variance. This advantageously obviates the need to maintain a large historical database in the ABE 20.

In general, the running mean and variance for the global trend component G(t) may be represented by the following symbols:

Global trend mean=$\mu_G(t)$

Global trend variance=$\sigma_G^2(t)$

In the simplest learning format, these values are continually updated for each new time trial as follows:

Global trend mean as of the previous time trial=$\mu_G(t-1)$

Global trend variance as of the previous time trial=$\sigma_G^2(t-1)$

New input variable measurement for the current time trial=$Y(t)$

Updated global trend mean $\mu_G(t)=w_G*\mu_G(t-1)+(1-w_G)*Y(t)$

Updated global trend variance $\sigma^{G2}(t)=w_G*\sigma_G^2(t-1)+(1-w_G)*[Y(t)-\mu_G^2(t)]^2$ In these equations, the historical weighting parameter $w_G$ is typically a user-specified parameter, which may be adjusted to "tune" the baseline model to adapt at a desired rate of change in the input variable Y(t) occurring over time. As noted above, the running mean and variance computation shown above may be considered as the simplest approach with a single learning block extending over all input data. That is, the historical data is represented by a single block having a running mean and variance. Of course, the learning function may be more complicated, for example by including multiple historical points or blocks, each having a separate learning weight. Nevertheless, the relatively simple learning function shown above may be suitable for many applications. An alternative decomposition and learning function for the global is given later in the description. It should also be noted that the use of learning blocks virtually eliminates the need to maintain a large database of historical data in the model, because the historical data is represented by one or more blocks that are weighted and factored in with new data for each time trial when computing the running mean and variance.

Figure 10:
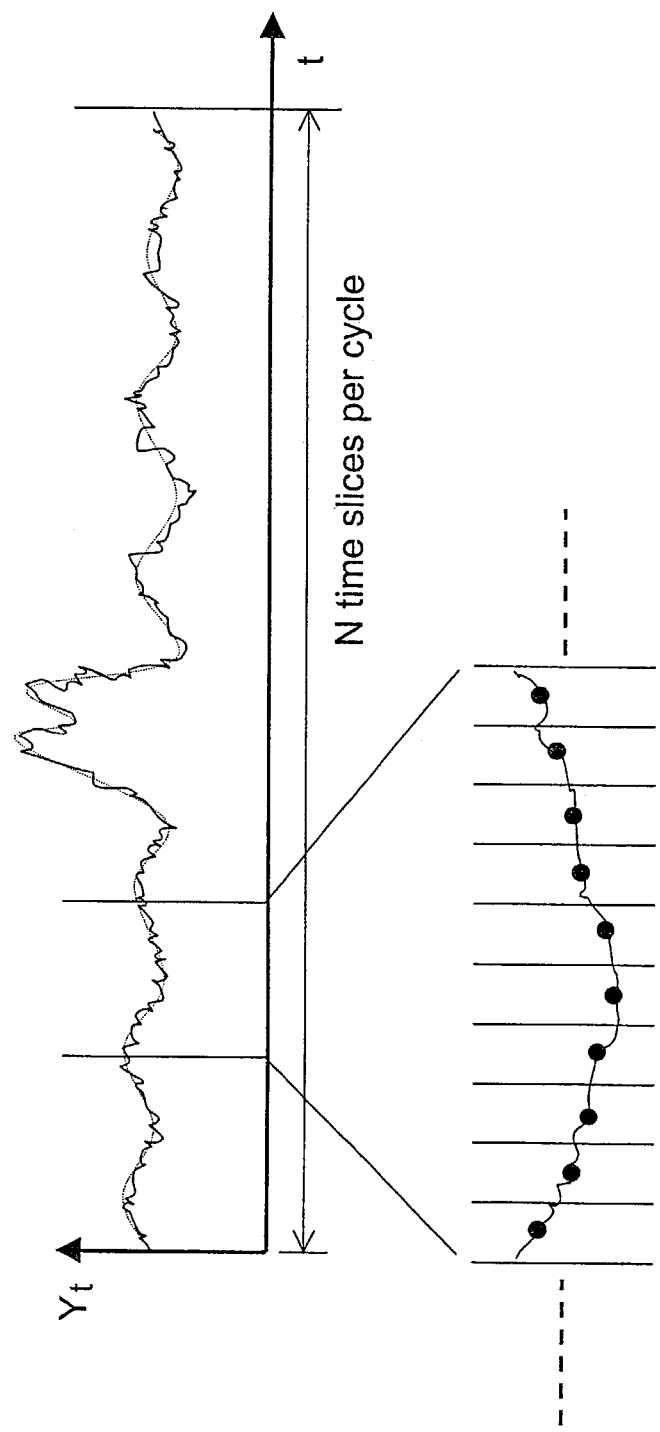
FIG. 10 is graph illustrating time slicing and sampling of the input variable signature shown in FIG. 9A.
Figure 11:
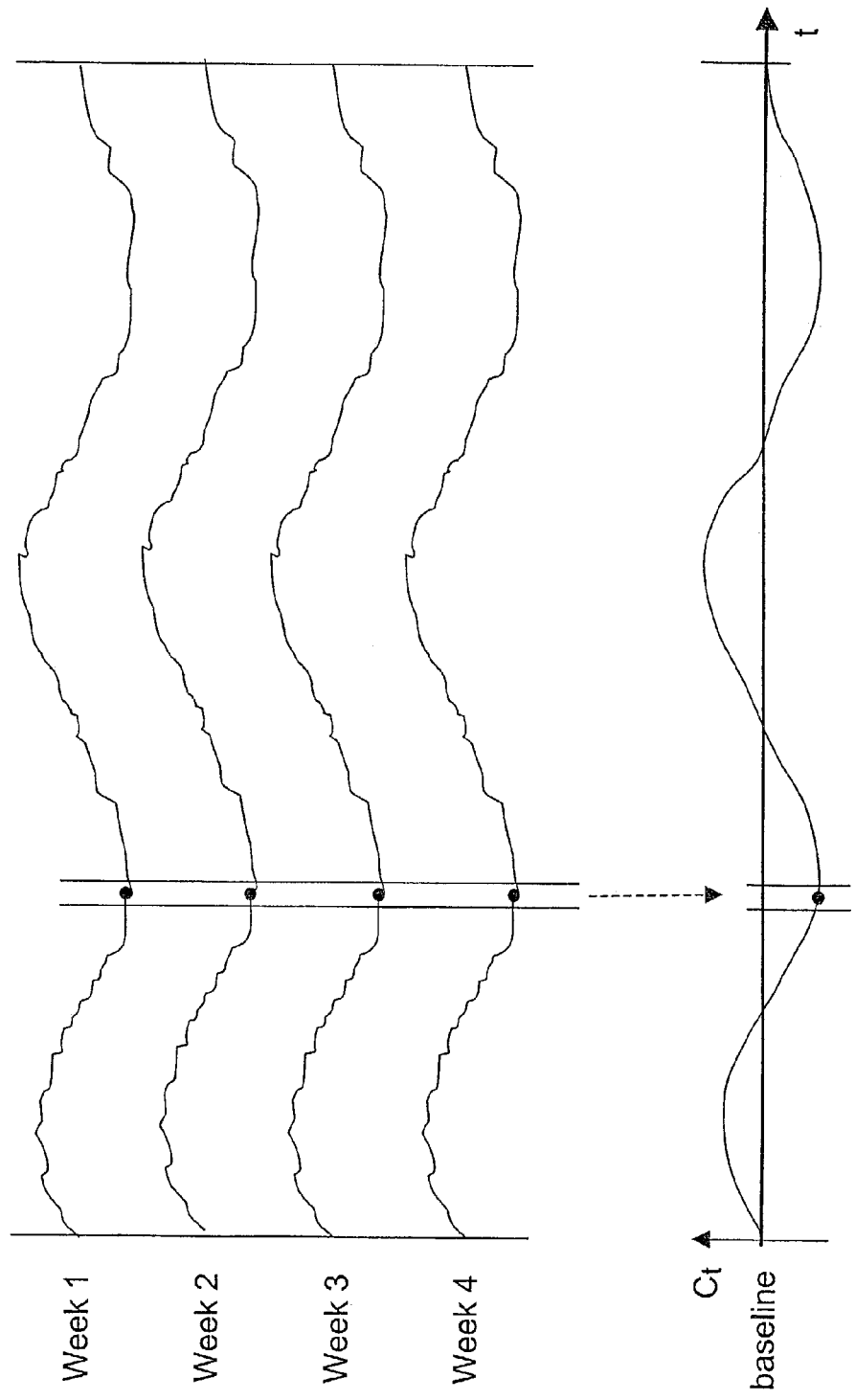
FIG. 11 is series of graphs illustrating a process for capturing the cyclical component of the input variable signature shown in FIG. 9A.

FIG. 9C is a graph illustrating the cyclical component 908, which is referred to as C(t). The cyclical component C(t) is typically captured by dividing the temporally contiguous signature Y(t) into a number of repeating cycles that each include "n" time periods or time slices, as shown generally in FIG. 10. Thus, each cycle will have the same set of time indices that refer to the same recurring time periods. For example, the time cycle may represent a year with "n" equal to 8,760, producing one time slice for each hour of the year. Thus, the time index "t=1" refers to the time period ending at 1:00 am on January 1, the time index "t=2" refers to the time period ending at 2:00 am on January 1, and so forth through the time index "t=8,760" referring to the time period ending at 12:00 am on January 1. Consecutive cycles may then be thought of as being arranged in a vertical stack, as shown in FIG. 11, such that the time slices align vertically for multiple cycles. A value of one week for the cycle length, divided into 672 time slices of 15 minutes, has been found to be suitable for monitoring a majority of computer server applications.

The cyclical component C(t) is typically captured by computing a running mean and variance for each time slice over multiple cycles. In other words, the cyclical component C(t) is typically computed by computing the running mean and variance of similar time slices over multiple cycles for the input variable Y(t). This computation, which is depicted graphically in FIG. 11, is referred to generally as the "time-slice mean and variance." Referring to FIGS. 9C and 11, the cyclical component C(t) shown in FIG. 9C may be captured by "vertically" summing the measurements from the same time slice over multiple cycles of the input variable Y(t), as shown in FIG. 11. This process is repeated for each time period in the cycle to compute the baseline signature of the component C(t).

Again, the time-slice values forming time series Y(t) are typically weighted to give accentuated significance to more recent data in the computation of the cyclical component. For example, a decreasing series of learning blocks may be used to weight the time-slice values from successive cycles when computing the running mean and variance for the cyclical component C(t). Moreover, the ABE 20 may represent the historical data for each time slice as a single mean and variance pair, or as several mean and variance pairs representing different historical blocks, which may then be weighted and factored in with the newly received input data value for each current time trial in the continuing time series. In general, the mean and variance for the cyclical component C(t) may be represented by the following symbols:

Cyclical mean=$\mu_c(t)$

Cyclical variance=$\sigma_c^2(t)$

In the simplest learning format in which "n" represents the number of time slices in a cycle, these values are continually updated for each new time trial as follows:

Cyclical mean as of the same time index in the previous cycle=$\mu_c(t-n)$

Cyclical variance as of the same time index in the previous cycle=$\sigma_G^2(t-n)$ New input variable measurement for the current time trial=$Y(t)$ Portion of the input variable measurement corresponding to the cyclical component for the current time trial, $Y_C(t)$ =Y(t)=$\mu_G(t)$.

Updated cyclical mean $\mu_c(t)=w_c*\mu_c(t-n)+(1-w_c)*Y_C(t)$

Updated cyclical variance $\sigma_c^2(t)=w_c*\sigma_c^2(t-n)+(1-w_c)*[Y_C(t)-\mu_c(t)]^2$ Again, the historical weighting parameter "$w_c$" is typically a user-specified parameter, which may be adjusted to "tune" the baseline model to adapt at a desired rate to changes in the input variable Y(t) occurring over time.

FIG. 9D is graph illustrating the seasonal or scheduled component 910, which is referred to as S(t). The seasonal or schedule component S(t) may be captured through a variety of analyses applied to the historical data for the input variable Y(t), or it may be established by a user input reflecting a known event, such as scheduled maintenance or another scheduled activity that will have a predictable effect on the observed system behavior. In general, the seasonal or schedule component S(t) represents known or predictable system events, which should be removed from the erratic component e(t) to avoid masking abnormal system behavior with this component of the representative input variable Y(t). Thus, in addition to the global trend component G(t) and the cyclical component C(t) described above, the seasonal or scheduled component S(t) should also be removed from the input variable Y(t) to obtain the unpredictable erratic component e(t).

When the seasonal or scheduled component S(t) is a known deterministic parameter, it may be subtracted directly from Y(t) to when computing the erratic component e(t). In addition, when the seasonal or schedule component S(t) is captured from measured data or modeled as a probabilistic function, it may be treated as a probabilistic component of the input variable Y(t) represented by a running mean and variance just like the global trend component G(t) and the cyclical component C(t). Therefore, the derivation of the seasonal or schedule component S(t) will not be further developed, except to note that it may be included as a probabilistic component of the input variable Y(t) along with the captured global trend component G(t) and the captured cyclical component C(t). The following parameters are defined for seasonal or schedule component S(t) the for this purpose:

Seasonal or scheduled mean=$\mu_S(t)$

Seasonal or scheduled variance=$\sigma_S^2(t)$

Moreover, it will be appreciated that the input variable Y(t) may be decomposed into any number of additional components corresponding to observable or scheduled events, which can each be factored into the time-based baseline model maintained by the ABE 20 in a similar manner. For instance, it will be obvious to one skilled in the art that instead of adjusting the input measurement value on the cyclical component, $Y_C(t)$, to obtain a zero mean cyclical component C(t), an adjusted input measurement $Y_G(t)$ could have been defined in a similar manner to $Y_C(t)$ and used for the global trend signature computation. In the latter case, the global trend could be viewed as a mean correction factor, and should normally be around zero (zero mean) except when unusual events happen and the global trends start shifting. Finally, any adjusted input measurement should take into account all the other components.

FIG. 9E is a graph illustrating the erratic component 912, which is referred to as e(t). In particular, the input variable Y(t) is decomposed into the global trend component G(t), the cyclical component C(t), the seasonal or scheduled component S(t), and the erratic component e(t) using the decomposition equation 904, which is shown adjacent to FIG. 9A. According to this equation, Y(t) and e(t) may be expressed as follows:

$Y(t)=G(t)+C(t)+S(t)+e(t)$ $e(t)=Y(t)-G(t)-C(t)-S(t)$

In the monitoring system 5, the erratic component e(t) is used as the basic process control variable for the predictive and monitoring operations because it is derived from the measured value Y(t) with the global trend component G(t), the cyclical component C(t), and the seasonal or scheduled component S(t) removed. Therefore, the erratic component e(t) is selected for further analysis because it reflects the abnormal system behaviors without the masking effects of the other components, which can be relatively large, widely fluctuating, and constantly changing over time. Moreover, the global trend component G(t), the cyclical component C(t), and the seasonal or scheduled component S(t) are separately modeled and tracked to detect any model changes that occur in these components over time.

In order to use the erratic component e(t) as the basic process control variable for the predictive and monitoring operations, it is helpful to combine the global trend component G(t), the cyclical component C(t), and the seasonal or scheduled component S(t) into a single construct, which is referred to as the time-based baseline mean and variance. From these statistics, other meaningful values, such as the standard deviation and standard error, may be computed for the baseline in the usual ways. The time-based baseline mean and variance [$\mu(t)$ and $\sigma^2(t)$] can be computed from the component running means and variances, as shown below:

Time-based baseline mean $\mu(t)=\mu_G(t)+\mu_C(t)+\mu_S(t)$

Time-based baseline variance $\sigma^2(t)=\sigma_G^2(t)+\sigma_C^2(t)+\sigma_S^2(t)$ From the preceding development, it should be appreciated that the ABE 20 maintains a time-based baseline mean and variance [$\mu(t)$ and $\sigma^2(t)$] for each input variable, as represented by the input variable Y(t), for each time index in the time cycle. Further, the ABE 20 updates the time-based baseline mean and variance by updating and summing the components as shown above, for each time trial. In this manner, the baseline model maintained by the ABE 20 automatically tracks changes in the baseline components over time. Accordingly, the ABE 20 is operative to return the time-based baseline mean and variance [$\mu(t)$ and $\sigma^2(t)$] for each input variable for any given time index (t). In addition, the ABE 20 is operative to update the baseline model using the input data received for any given time trial.

Returning to FIG. 1, the engine system 10 interacts with the ABE 20 by invoking the ABE for a particular current or future time trial, as desired. To do so, the engine system 10 only needs to specify the desired time index, and the ABE 20 returns the time-based baseline mean and variance [$\mu(t)$ and $\sigma^2(t)$] for that time index. In particular, for each current time trial (t), the engine system 10 typically invokes the ABE 20 to obtain the time-based baseline mean and variance [$\mu(t)$ and $\sigma^2(t)$] for that time trial. The monitoring system 5 then uses the time-based baseline mean and variance for the current time trial in a monitoring process, which is also referred to as an imputing process for the current time trial. Also for each time trial, the engine system 10 typically invokes the ABE 20 for a number of future time trials, represented by the time index (t+T), to obtain the time-based baseline means and variances [$\mu(t+T)$ and $\sigma^2(t+T)$] for those future time periods. The monitoring system 5 then uses these time-based baseline means and variances for the future time trials in a forecasting process, which is also referred to as a predicting process.

Referring to a current time trial (t) for illustrative purposes, the engine system 10 receives the real-time input variable Y(t) for the current time trial (t) and invokes the ABE 20 by sending the time index for the current time trial to the ABE. The ABE 20 then computes the time-based baseline mean and variance [$\mu(t)$ and a $\sigma^2(t)$] from its components as shown below:

Time-based baseline mean $\mu(t)=\mu_G(t)+\mu_C(t)+\mu_S(t)$

Time-based baseline variance $\sigma^2(t)=\sigma_G^2(t)+\sigma_C^2(t)+\sigma_S^2(t)$ The ABE 20 then returns the time-based baseline mean and variance [$\mu(t)$ and $\sigma^2(t)$] for the current time trial (t) to the engine system 10, which computes the erratic component e(t) for the input variable Y(t) for the current time trial (t) as shown below:

$e(t)=Y(t)-i(t)$

It should be noted that the time-based baseline mean and variance is returned to the engine system prior updating the baseline with the input measurement from the current time trial. This is to ensure the current erratic component remains independent from the learned history and that the baseline be unbiased when the estimation and alert detection are done as described below.

The engine system 10 then invokes the ACE 30 by sending the erratic component e(t) to the ACE. The ACE 30 is a multivariate correlation engine described in the following commonly-owned patents and patent applications, which are hereby incorporated by reference: U.S. Pat. Nos. 5,835,902; 6,216,119; 6,289,330; and co-pending U.S. patent application Ser. No. 09/811,163. In general, the ACE computes an imputed estimate for the erratic component based on the values received for the other input variables for the current time trial and learned parameters representing observed relationships between the other variables and the subject input variable Y(t). That is, the monitoring or imputing step is based on real-time data for the current time trial for all of the input variables other than the subject input variable Y(t), and the covariance parameters represented by the learned parameters in the ACE, which represent observed relationships between the other variables and the subject input variable Y(t).

The ACE 30 then returns the imputed estimate and the standard error for the imputed estimate to the engine system 10. These parameters are referred to as shown below:

Imputed estimate=$e^I(t)$

Standard error for imputed estimate=$\eta^I(t)$

The engine system 10 then invokes the real-time alert detector 42 by sending it the erratic component e(t), the imputed estimate $e^I(t)$, and the standard error $\eta^I(t)$ for the imputed estimate. The real-time alert detector 42 then computes a threshold value for the imputed estimate based on a confidence value, in this instance the standard error $\eta^I(t)$. However, it will be appreciated that other confidence values may be used, such as those based on the variance, standard deviation, or other statistics associated with the baseline model, the imputed estimate, or other parameters.

Typically, the threshold value may be computed as a weighting factor multiplied by the selected confidence value, where the weighting factor is a user-defined parameter that allows the user to tune this aspect of the monitoring system. Further, an alert status for the imputed estimate is typically determined by comparing the magnitude of the difference between the measured erratic component e(t) and the imputed estimate $e^I(t)$ for the erratic component to the threshold value, as shown below:

$Ie(t)-e^I(t)I<k_1\eta^I(t)$

In this equation, a value of six (6) has been found to be suitable for the user-defined weighting parameter $k_1$. The real-time alert detector 42 informs the alarm generator 46 of any impute estimate alerts, which tracks and scores the alerts, and generates one or more alarms. Of course, other threshold tests may be employed, as appropriate for the particular monitored system. However, the threshold test shown above has been found to be suitable for monitoring a typical complex computer network or server system.

The preceding description applies to the operation of the monitoring system 5 in the monitoring or imputing phase for the current time trial, which involves the computation of the imputed estimate for the current time trial, and the determination of imputed estimate alerts based on a comparison of the imputed estimate and the corresponding erratic component $e(t)$, which is derived from the received measurement for the subject input variable $Y(t)$ for the current time trial.

However, the imputing phase is only the first half of the operation. For each time trial, the monitoring system 5 also updates the ABE 20 and the ACE 30 for the data received during the current time trial, and then computes forecast estimates and associated forecast alerts for one or more future time trials. These future time trials are referred to by the time index $(t+T)$, and it should be understood that the monitoring system 5 typically performs the forecasting processed described below for each of several future time trials (e.g., every time trial in the cycle, every time trial for multiple cycles into the future, or another desired set of future time trials). Because the forecasting process is identical for each future time trial except for the time index, the forecasting process is described only for the representative future time index $(t+T)$. In sum, it should be appreciated that the entire monitoring process is repeated for each of several input variables, for the current time trial and for each of many future time trials, as the system runs over time.

To update the baseline model, the engine system 10 invokes the ABE 20 and supplies it with the real-time input value $Y(t)$ for the current time trial. The ABE 20 then updates the time-based mean and variance as described previously in accordance with the equation shown below for the global trend component $G(t)$, cyclical component $C(t)$, and seasonal or scheduled component $S(t)$. Additional components may be added as appropriate for a particular application.

Updated global trend mean $\mu_G(t)=w_G*\mu_G(t-1)+(1-w_G)*Y(t)$

Updated global trend variance $\sigma_G^2(t)=w_G*\sigma_G^2(t-1)+(1-w_G)*[Y(t)-\mu_G(t)]^2$ Adjusted input measurement for cyclical component $Y_C(t)=Y(t)-\mu_G(t-1)$.

Updated cyclical mean $\mu_c(t)=w_c*\mu_c(t-n)+(1-w_c)*Y_C(t)$

Updated cyclical variance $\sigma_c^2(t)=w_c*\sigma_c^2(t-n)+(1-w_c)*[Y_C(t)-\mu_c(t)]^2$ Adjusted input measurement for seasonal component $Y_S(t)=Y(t)-\mu_G(t-1)-\mu_c(t-n)$.

Updated seasonal or scheduled mean $\mu_S(t)=w_S*\mu_S(t-m)+(1-w_S)*Y_S(t)$

Updated seasonal or variance $\sigma_S^2(t)=w_S*\sigma_S^2(t-m)+(1-w_S)*[Y_S(t)-\mu_S(t)]^2$ Updated time-based baseline mean $\mu(t)=\mu_G(t)+\mu_C(t)+\mu_S(t)$ Updated time-based baseline variance $\sigma^2(t)=\sigma_G^2(t)+\sigma_C^2(t)+\sigma_S^2(t)$ Where n corresponds to the number of time slice per cycle and m corresponds to the number of time slices since of the last similar seasonal or schedule event. In addition, the ACE 30 automatically updates its learned parameters in the manner described in U.S. Pat. Nos. 5,835,902; 6,216,119; 6,289,330; and co-pending U.S. patent application Ser. No. 09/811,163.

Still referring to FIG. 1, the engine system 10 interacts with the ABE 20 to perform forecasting operations by invoking the ABE for a particular representative future time trial $(t+T)$. To do so, the engine system 10 only needs to specify the future time index $(t+T)$, and the ABE 20 returns the expected time-based baseline mean and variance $[\mu t(t+T)$ and $\sigma^2(t+T)]$ for that time index. In particular, for each time trial the engine system 10 typically invokes the ABE 20 to obtain the time-based baseline mean and variance $[\mu(t+T)$ and $\sigma^2(t+T)]$. The monitoring system then uses the time-based baseline mean and variance for the selected future time trial in the forecast process, which is also referred to as a predicting process. Referring to the representative future time trial $(t+T)$ for illustrative purposes, the engine system 10 invokes the ABE 20 by sending the time index $(t+T)$ to the ABE. The ABE 20 then computes the time-based baseline mean and variance $[\mu(t+T)$ and $\sigma^2(t+T)]$ from its components as shown below:

Time-based baseline mean $\mu(t+T)=\mu_G(t+T)+\mu_C(t+T)+\mu_S(t+T)$

Time-based baseline variance $\sigma^2(t+T)=\sigma_G^2(t+T)+\sigma_C^2(t+T)+\sigma_S^2(t+T)$ The engine system 10 then invokes the ACE 30 for the selected future time trial. The ACE 30 then returns the forecast estimate and the standard error for the forecast estimate to the engine system 10. These parameters are referred to as shown below:

Forecast estimate$=e^F(t+T)$

Standard error for forecast estimate$=\eta^F(t+T)$

The engine system 10 then invokes the forecast alert detector 44 by sending it the forecast estimate $e^F(t+T)$, the standard error for forecast estimate $\eta^F(t+T)$, and other values that may be used as or to compute a confidence value, such as the time-based baseline standard deviation $\sigma(t+T)$ (which is the square-root of the time-based baseline variance $\sigma^2(t+T)$ returned by the ABE 20). The forecast alert detector 44 then computes a threshold value for the forecast estimate based on a confidence value, in this particular example the time-based baseline standard deviation $\sigma(t)$. In addition, the threshold value may be a weighting factor multiplied by the confidence value, where the weighting factor is a user-defined parameter that allows the user to tune this aspect of the monitoring system. Further, an alert status for the forecast estimate is typically determined by comparing the magnitude of the forecast estimate to the threshold value, as shown below:

$Ie^F(t+T)I<k_2\sigma(t+T)$

In this equation, a value of two (2) has been found to be suitable for the user-defined weighting parameter $k_2$. The forecast alert detector 44 then informs the alarm generator 46 of any forecast estimate alerts, which tracks and scores the alerts, and generates on or more alarms. It should also be appreciated that the forecast alert detector 44 could apply other suitable threshold tests instead of or in addition to the test described above. In particular, a forecast estimate threshold test may be based on the standard error for forecast estimate $\eta^F(t+T)$, the forecast estimate $e^F(t+T)$ and the expected baseline mean $\mu(t+T)$.

It should also be understood that other types of updating algorithms may be employed for the baseline model maintained by the ABE 20. For example, the following updating algorithm has been found to be suitable for monitoring systems applied to typical computer servers and networks. For this derivation, let (t) denote the time index for the current time trial and (t−1) represent the time index for the previous time trial. In addition, let (T) denote a cycle duration and (n) represent the number of time slices in a cycle. Also let the time index (k) correspond to the current time point "modulo n" as it appears in the successive cycles, that is, if t modulo n equals k, then the index for time trial t−n also correspond to time index k.

At time (t), the monitoring system 5 receives the input value Y(t) for the current time trial, and invokes the ABE 20 for the current time trial, which returns the time-based baseline mean and variance as of the previous time trial [$\mu(t-1)$ and $\sigma^2(t-1)$]. To develop the updating algorithm, let k denote the current time index within the cycle. The baseline mean and variances for the current time trial are then given as:

$$\mu(t)=\mu_G(t-1)+\mu_C(t-n)$$

$$\sigma^2(t)=\sigma_G^2(t-1)+\sigma_C^2(t-n)$$

The erratic component e(t) is then computed as follows:

$$e(t)=Y(t)-\mu_G(t-1)-\mu_C(t-n)$$

The global trend component G(t) is then updated as follows:

$$G(t)=Y(t)-\mu_C(t-n)$$

$$\mu_G(t)=[w_G(t)*G(t)+\mu_G(t-1)]/(1+w_G(t))$$

$$d=G(t)-\mu_G(t)$$

$$\sigma_G^2(t)=w_G(t)*d*d+\sigma_G^2(t-1)/(1+w_G(t))$$

The cyclical component C(t) is then updated as follows:

$$C(t)=Y(t)-\mu_G(t)$$

$$\mu_C(k)=[w_C(t)*C(t)+\mu_C(t-n)]/(1+w_C(t))$$

$$d=C(t)-\mu_C(t-n)$$

$$\sigma_C^2(k)=w_C(t)*d*d+\sigma_C^2(t-n)/(1+w_C(t))$$

Where $w_G$ and $w_C$ are weighting factors that depend on learning blocks, adjusting for missing values, etc. Note that the mean and variance values at time point t−n correspond to the values of the mean and variance at time slice k before the corresponding values are updated. In addition, the time-based baseline means may be initialized in the following manner:

Let $\mu_G(t)=0$; $\mu_C(k)=0$; $\sigma_G^2(t)=1$; $k=0,\ldots,N-1,$.

For the first cycle, compute only the baseline for the global trend using a learning block of length N, and set $\mu_C(k)=Y(t)$, which is equivalent to setting $w_G(t)=1/(1+k)$. At the end of the first cycle, fork=0, . . . , N−1, compute the following:

$$\mu_C(k)=\mu_C(k)-\mu_G(t)$$

$$\sigma_C^2(k)=\sigma_G^2(t)/2$$

$$\sigma_G^2(t)=\sigma_G^2(t)/2$$

Then, for cycle 2, compute the following:

$$w_C(k)=1/(1+t\ mod\ NC);$$

where NC is the learning block in terms of cycles $w_G(t)$ as below.

And thereafter, compute the following:

$$w_G(t)=1/(N^*+t\ mod\ N^*);$$

where N* may or may not equal N, $$w_C(t)=1/(NC+[t/N^*]mod\ NC).$$

Those skilled in the art will appreciate that other updating formulas using learning blocks and other suitable methodologies may be implemented.

Figure 2:
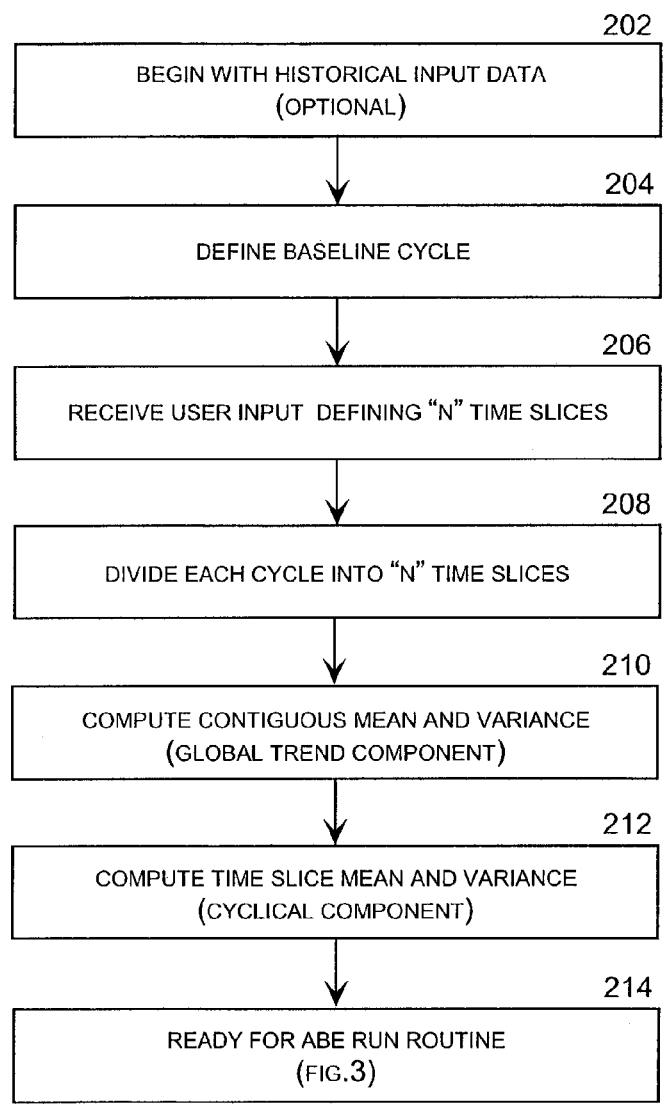
FIG. 2 is a logic flow diagram illustrating a routine for provisioning the adaptive baseline engine component of the monitoring system.

FIG. 2 is a logic flow diagram illustrating a routine 200 for setting up or provisioning the adaptive baseline engine (ABE) 20 component of the monitoring system 5 in advance of running the system. The following description of routine 200 will also refer to FIGS. 9A-E, 10 and 11 for clarity. In step 202, the ABE 20 receives historical data for a representative input variable Y(t), as shown in FIG. 9A. The ABE 20 then processes the historical data to establish the time-based baseline mean and variance [$\mu(t)$ and $\sigma^2(t)$] for that variable. However, the use of historical data is optional, and the ABE 20 may alternatively begin the process without historical data. In this case, the ABE 20 uses a temporally contiguous running mean (i.e., the mean and variance for the cyclical component [$\mu_c(t)$ and $\sigma_c^2(t)$] computed horizontally for the first cycle). Thereafter, the cyclical component C(t) is computed as a time-slice mean and variance, as shown in FIG. 11.

Step 202 is followed by step 204, in which the ABE 20 defines a baseline cycle, such as a week, month or year. For example, the cycle is depicted as a calendar week in FIG. 11. Step 204 is followed by step 206, in which the ABE 20 receives a user input parameter "n" that defines the number of time slices in the cycle, as shown in FIG. 10. The ABE 20 then samples the input data to obtain a time series of "n" data points for each cycle, which is also shown in FIG. 10. Alternatively, if the input data is already expressed as discrete data points, the user input parameter "n" sets the cycle length by defining the number of data points included in each cycle. In either case, step 206 is followed by step 208, in which the ABE 20 effectively divides the historical data into a number of repeating cycles, each having "n" time slices that are numbered consecutively to establish a time index (i.e., time slices 1 through n) that repeats for each cycle.

Step 208 is followed by step 210, in which the ABE 20 computes the global trend component G(t) of the input variable Y(t) by computing a temporally contiguous running mean and variance for the input variable Y(t), as depicted in FIG. 9B. That is, the global trend component G(t) is captured by computing a weighted mean and variance [$\mu_G(t)$, $\sigma_G^2(t)$] horizontally along the graph of Y(t) shown in FIG. 9A to obtain the global trend component G(t), which is shown in FIG. 9B.

Step 210 is followed by step 212, in which the ABE 20 computes the cyclical component C(t) of the input variable Y(t) by computing the time slice running mean and variance as shown in FIG. 11. That is, the cyclical component C(t) is captured by computing a weighted mean and variance [$\mu_C(t)$, $\sigma_C^2(t)$] vertically for the same time slice over multiple cycles, for each time increment n the cycle, as shown in FIG. 11. The resulting cyclical component C(t) is shown in FIG. 9C.

The ABE 20 may then capture other components of the input variable Y(t), such as a mean and variance [$\mu_S(t)$, $\sigma_S^2(t)$] for the seasonal or scheduled component S(t) shown in FIG. 9D and other components that may be appropriate for a particular application. In each case, the objective of the provisioning routine 200 is to decompose the input variable Y(t) into a number of components representing relatively predictable behaviors so that the erratic component e(t) may be isolated for further processing, as shown in FIG. 9E. In addition, the decomposition process allows the relatively predictable components of the time-based baseline for the input variable Y(t) to be captured and modeled individually. In this particular example, the baseline includes the global trend component G(t), the cyclical component C(t), and the seasonal or scheduled component S(t). Step 212 is followed by step 214, in which the ABE 20 is ready for the run routine 300 shown on FIG. 3.

Figure 3:
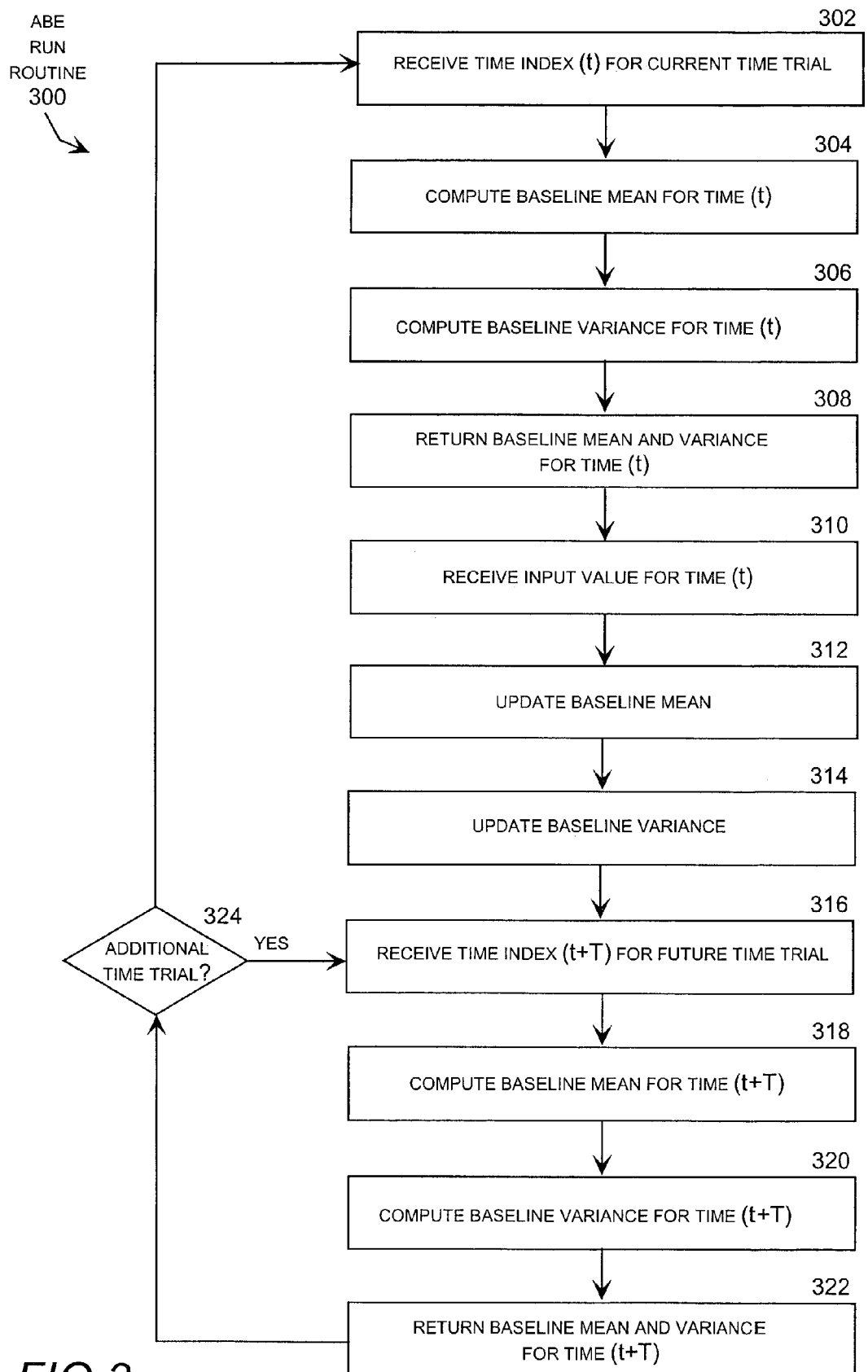
FIG. 3 is a logic flow diagram illustrating a routine for running the adaptive baseline engine component of the monitoring system.

FIG. 3 is a logic flow diagram illustrating a routine 300 for running the ABE 20. In step 302, the ABE 20 receives a time index (t) for the current time trial from the engine system 10. Step 302 is followed by step 304, in which the ABE 20 computes the time-based baseline mean for the current time trial (t), typically by summing the component means as shown below:

Time-based baseline mean $\mu(t)=\mu_G(t)+\mu_C(t)+\mu_S(t)$

Step 304 is followed by step 306, in which the ABE 20 computes the time-based baseline variance for the current time trial (t), typically by summing the component variances as shown below:

Time-based baseline variance $\sigma_2(t)=\sigma_G^2(t)+\sigma_C^2(t)+\sigma_S^2(t)$ Step 306 is followed by step 308, in which the ABE 20 returns the time-based baseline mean and variance [$\mu(t)$, $\sigma^2(t)$] for the current time trial to the engine system 10.

Step 308 is followed by step 310, in which the ABE 20 receives the input value Y(t) for the current time trial from the engine system 10. Step 310 is followed by step 312, in which the ABE 20 updates the baseline mean $\mu(t)$, typically by updating the component means as shown below:

Updated global trend mean $\mu_G(t)=w_G^*\mu_G(t-1)+(1-w_G)^*Y(t)$

Updated cyclical mean $\mu_c(t)=w_c^*\mu_c(t-n)+(1-w_c)^*[Y(t)-\mu_G(t)]$

Updated seasonal or scheduled mean=$\mu_S(t)$

Updated time-based baseline mean $\mu(t)=\mu_G(t)+\mu_C(t)+\mu_S(t)$

Step 312 is followed by step 314, in which the ABE 20 updates the baseline variance $\sigma^2(t)$, typically by updating the component variances as shown below:

Updated global trend variance $\mu_G^2(t)=w_G^*\sigma_G^2(t-1)+(1-w_G)^*[Y(t)-\mu_G(t)]^2$ Updated cyclical variance $\sigma_c^2(t)=w_c^*\sigma_c^2(t-n)+(1-w_c)^*[Y(t)-\mu_c(t-n)-\mu_G(t)]^2$ Updated seasonal or variance=$\sigma_S^2(t)$ Updated time-based baseline variance $\sigma^2(t)=\sigma_G^2(t)+\sigma_C^2(t)+\sigma_S^2(t)$ After the baseline model has been updated as shown above, step 314 is followed by step 316, in which the ABE 20 receives a time index (t+T) for a future time trial from the engine system 10. Step 316 is followed by step 318, in which the ABE 20 computes the time-based baseline mean for the future time trial (t+T), typically by summing the component means as shown below:

Time-based baseline mean $\mu(t+T)=\mu_G(t)+\mu_C(t+T)+\mu_S(t+T)$

Step 318 is followed by step 320, in which the ABE 20 computes the time-based baseline variance for the future time trial (t+T), typically by summing the component means as shown below:

Time-based baseline variance $\sigma^2(t+T)=\sigma_G^2(t)+\sigma_C^2(t+T)+\sigma_S^2(t+T)$ Step 320 is followed by step 322, in which the ABE 20 returns the baseline mean and variance for the future time trial [$\mu(t+T)$, $\sigma^2(t+T)$] to the engine system 10. Step 322 is followed by step 324, in which the ABE 20 determines whether the engine system 10 has specified another future time trial. If the engine system 10 has specified another future time trial, the "YES" branch is followed to step 316, and the ABE 20 computes and returns the baseline mean and variance [$\mu(t+T)$, $\sigma^2(t+T)$] for the additional future time trial. If the engine system 10 has not specified another future time trial, the "NO" branch is followed to step 303, in which the ABE 20 waits to receive another time index from the engine system 10 for the next current time trial. It should be understood that the routine 300 described above is typically performed simultaneously or sequentially for each of several input variables, and for each in a continual series of current time trials.

Figure 4:
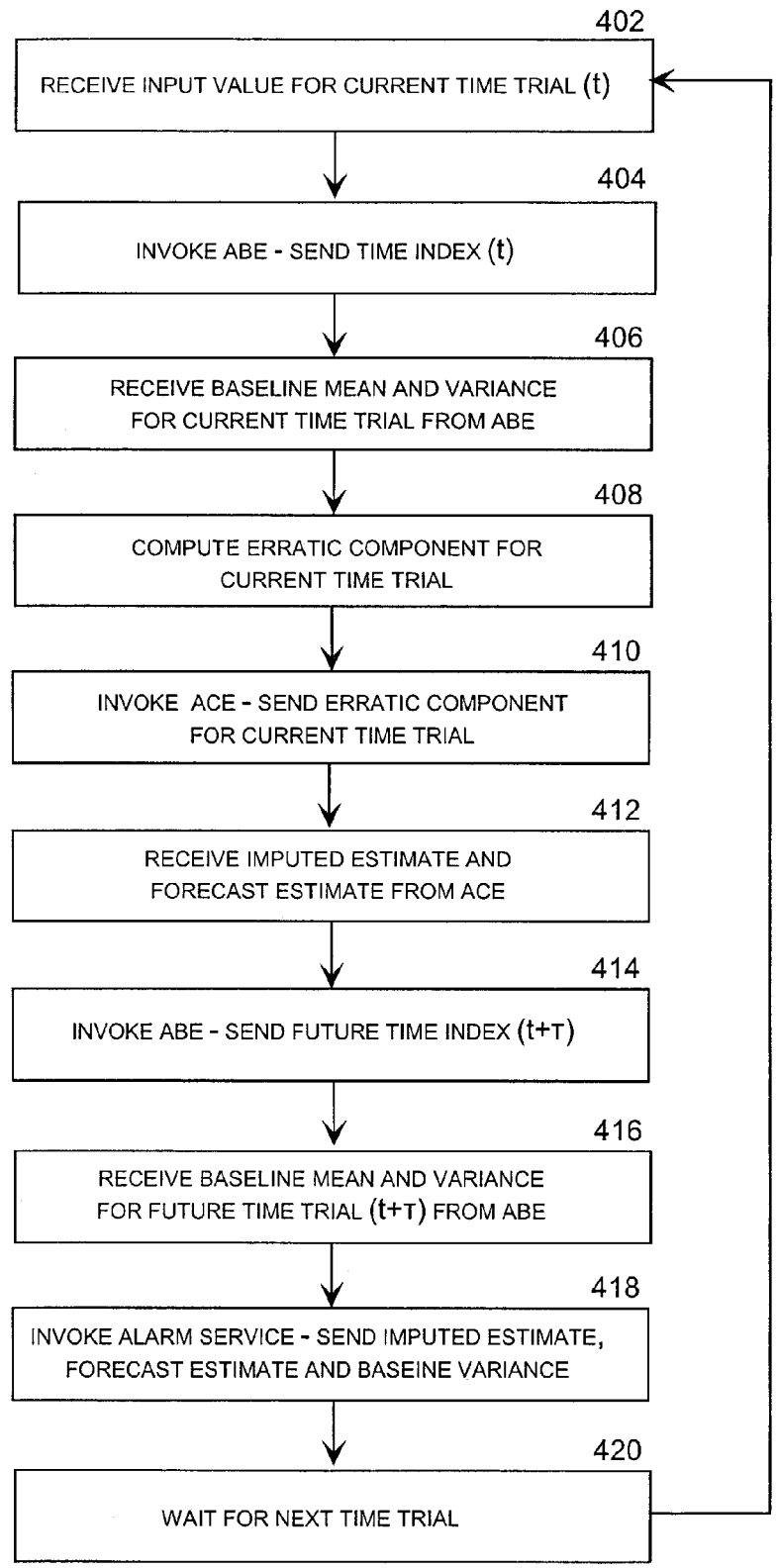
FIG. 4 is a logic flow diagram illustrating a routine for running the engine system component of the monitoring system.

FIG. 4 is a logic flow diagram illustrating a routine 400 for running the engine system 10 of the monitoring system 5. In step 402, the engine system 10 receives a measurement for the representative input variable Y(t) for the current time trial (t). Step 402 is followed by step 404, in which the engine system 10 invokes the ABE 20 by sending it the time index for the current time trial (t). Step 404 is followed by step 406, in which the engine system 10 receives the time-based baseline mean and variance [$\mu(t)$, $\sigma^2(t)$] for the current time trial (t) from the ABE 20. Step 406 is followed by step 408, in which the engine system 10 computes the erratic component e(t) for the current time trial as shown below:

$e(t)=Y(t)-\mu(t)$

Step 408 is followed by step 410, in which the engine system 10 invokes the ACE 30 by sending it the erratic component e(t) for the current time trial. Step 410 is followed by step 412, in which the engine system 10 receives the imputed estimate e'(t) and the standard error for imputed estimate=$\eta^I(t)$ from the ACE 30.

Step 410 is followed by step 412, in which the engine system 10 invokes the ABE 20 by sending it the time index for a future time trial (t+T). Step 412 is followed by step 414, in which the engine system 10 receives the time-based baseline mean and variance [$\mu(t+T)$, $\sigma^2(t+T)$] for the future time trial (t+T) from the ABE 20. Step 416 is followed by step 418, in which the engine system 10 invokes the alarm service 20 by sending it one or more of the following parameters: the erratic component e(t), the baseline mean μ(t), the baseline variance $\sigma^2$(t), the imputed estimate $e^I$(t), the standard error for the imputed estimate $\eta^I$(t), the forecast estimate $e^F$(t+T), and the standard error for forecast estimate $\eta^F$(t+T). In particular, for an illustrative embodiment, the engine system 10 may send the erratic component e(t), the imputed estimate $e^I$(t), and the standard error for the imputed estimate $\eta^I$(t) to the real-time alert detector 42; and it may send the forecast estimate $e^F$(t+T) and baseline variance $\sigma^2$(t+T) and/or the standard error for forecast estimate=$\eta^F$(t+T) to the forecast alert detector 44.

Step 418 is followed by step 420, in which the engine system 10 waits for the next time trial, at which time it loops back to step 402 and repeats routine 400 for the next time trial. It should also be understood that for each time trial, routine 400 is repeated for each of several desired input variables, as represented by the input variable Y(t), and that steps 414 through 418 are typically be repeated for each of several future time trials, as desired.

Figure 5:
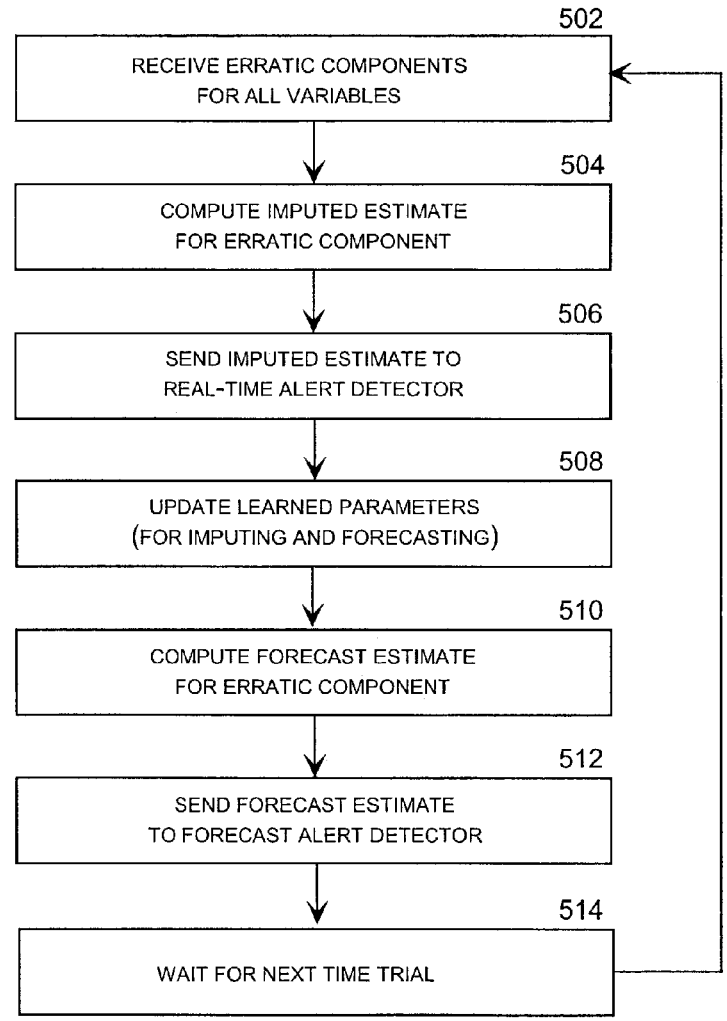
FIG. 5 is a logic flow diagram illustrating a routine for running the adaptive correlation engine component of the monitoring system.

FIG. 5 is a logic flow diagram illustrating a routine 500 for running the ACE 30. In step 502, the ACE 30 receives the erratic components e(t) for all of the applicable input variables, as represented by the input variable Y(t), for the current time trial (t). Step 502 is followed by step 504, in which the ACE 30 computes an imputed estimate $e^I$(t) for each input variable. In particular, the imputed estimate $e^I$(t) for the subject input variable Y(t) is based on the data received for the current time trial for all of the other input variables and the learned parameters in the ACE 30, which represent observed relationships between the erratic component e(t) for the subject input variable and the erratic components for the other input variables. This allows the imputed estimate $e^I$(t) to reflect the data received for the current time trial and covariance relationships based on historical time trials represented by the learned parameters in the ACE 30.

Step 504 is followed by step 506, in which the ACE 30 invokes the real-time alert detector 42 and sends it the erratic component e(t) and the $e^I$(t). Step 506 is followed by step 508, in which the ACE 30 updates its leaned parameters using the data received for the input variables for the current time trial. This updating process is described in the following commonly-owned patents and patent applications: U.S. Pat. Nos. 5,835,902; 6,216,119; 6,289,330; and co-pending U.S. patent application Ser. No. 09/811,163.

Step 508 is followed by step 510, in which the ACE 30 computes the forecast estimate $e^F$(t+T). Note that the learning is performed by the ACE 30 after the imputing step 504 and before the forecasting step 510. Step 512 is followed by step 514, in which the ACE 30 returns the forecast estimate $e^F$(t+T) and the standard error for forecast estimate $\eta^F$(t+T) to the engine system 10, which in turn invokes the alert detector 42 by sending it one or more of these parameters and/or the baseline variance $\sigma^2$(t+T). Following step 514, the ACE 30 waits for the next time trial. Again, it should also be understood that for each time trial, routine 500 is repeated for each of several desired input variables, as represented by the input variable Y(t), and that steps 510 through 512 are typically repeated for each of several future time trials, as desired.

Figure 6:
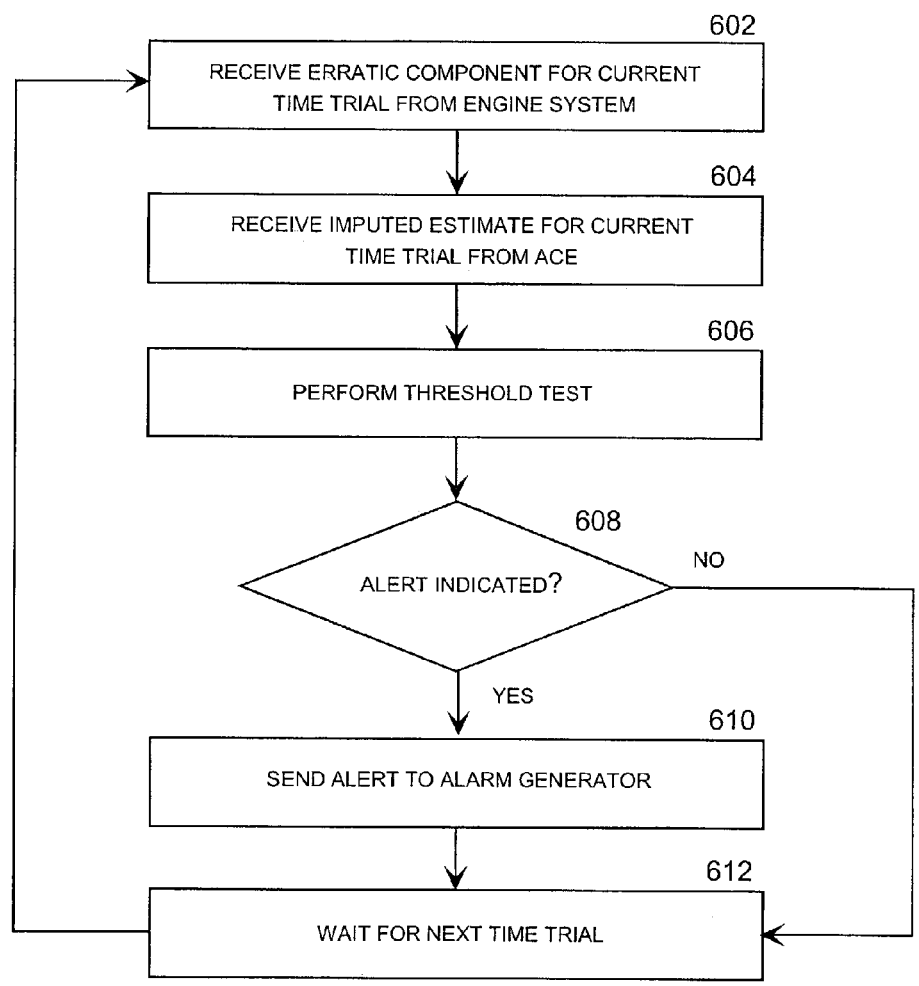
FIG. 6 is a logic flow diagram illustrating a routine for running a real-time alert detector component of the monitoring system.

FIG. 6 is a logic flow diagram illustrating a routine 600 for running the real-time alert detector 42. In step 602, the real-time alert detector 42 receives the erratic component e(t) for the subject input variable Y(t) from the engine system 10. Step 602 is followed by step 604, in which the real-time alert detector 42 receives the imputed estimate $e^I$(t) for the subject input variable Y(t) from the engine system 10. Step 604 is followed by step 606, in which the real-time alert detector 42 performs a threshold alert test, typically by performing the following operation:

$$Ie(t)-e^I(t)I<k_1\eta^I(t)$$

As noted previously, in this equation a value of six (6) has been found to be suitable for the user-defined weighting parameter $k_1$. Step 606 is followed by step 608, in which the real-time alert detector 42 determines whether an alert status is indicated based in the preceding or a similar threshold test. If an alert status is indicated, the "YES" branch is followed to step 610, in which the real-time alert detector 42 informs the alarm generator 46 of the imputed estimate alert. Step 610 is followed by step 612, in which the real-time alert detector 42 waits for the next time trial, at which time it loops to step 602 and repeats routine 600 for the next time trial. If an alert status is not indicated, the "NO" branch is followed from step 608 to step 610, in which the real-time alert detector 42 waits for the next time trial without informing the alarm generator 46 of an imputed estimate alert. It should be understood that for each time trial, routine 600 is typically repeated for each of several desired input variables, as represented by the input variable Y(t).

Figure 7:
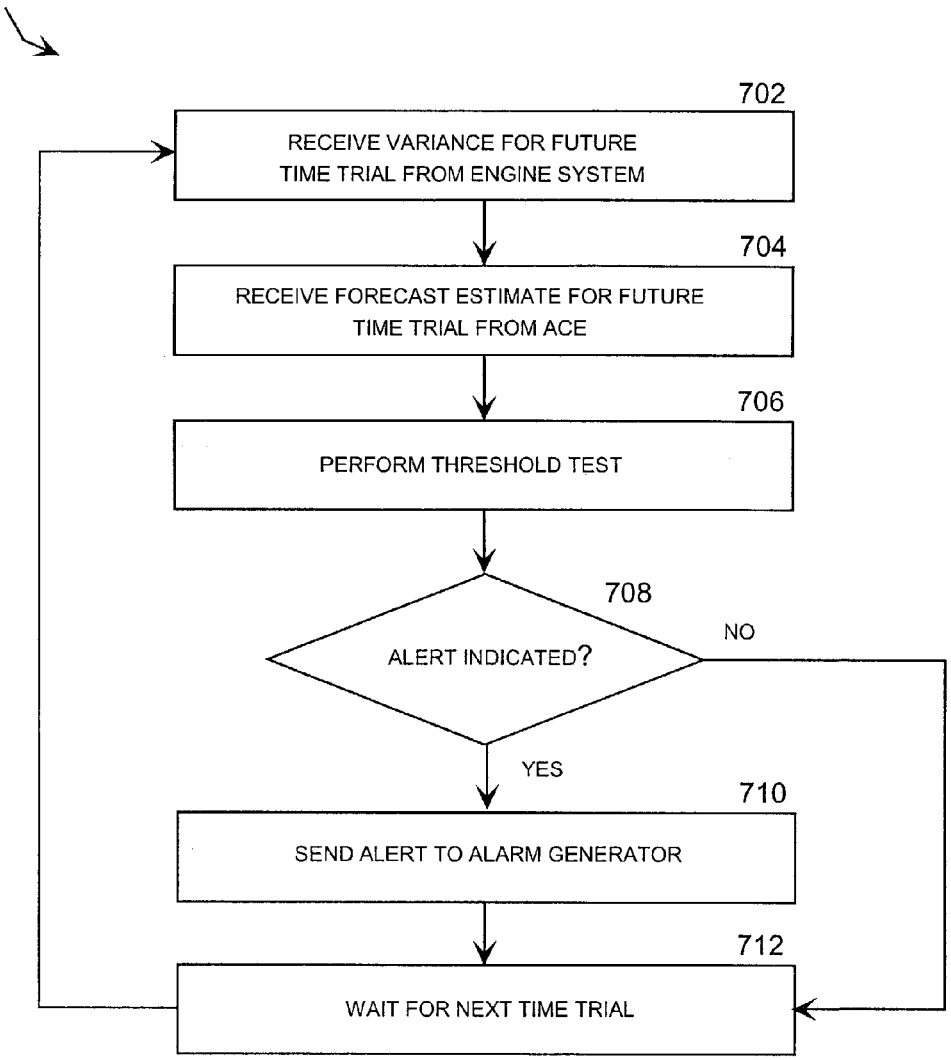
FIG. 7 is a logic flow diagram illustrating a routine for running a forecast alert detector component of the monitoring system.

FIG. 7 is a logic flow diagram illustrating a routine 700 for running the forecast alert detector 44. In step 702, the forecast alert detector 44 receives the baseline variance $\sigma^2$(t+T) for the subject input variable Y(t) for the future time trial (t+T) from the engine system 10. Step 702 is followed by step 704, in which the forecast alert detector 44 receives the forecast estimate $e^F$(t+T) for the future time trial (t+T). Step 704 is followed by step 706, in which the forecast alert detector 44 performs a threshold alert test, typically by performing the following operation:

$$Ie^F(t+T)I<k_2\sigma(t+T)$$

As noted previously, in this equation a value of two (2) has been found to be suitable for the user-defined weighting parameter $k_2$. Step 706 is followed by step 708, in which the forecast alert detector 44 determines whether an alert status is indicated based on the preceding or a similar threshold test. If an alert status is indicated, the "YES" branch is followed to step 710, in which the forecast alert detector 44 informs the alarm generator 46 of the forecast estimate alert. Step 710 is followed by step 712, in which the forecast alert detector 44 waits for the next time trial, at which time it loops to step 702 and repeats routine 700 for the next time trial. If an alert status is not indicated, the "NO" branch is followed from step 708 to step 710, in which the forecast alert detector 44 waits for the next time trial without informing the alarm generator 46 of a forecast estimate alert. It should also be understood that for each time trial, routine 700 is typically repeated for each of several future time trials, and for each of several desired input variables, as desired.

Figure 8:
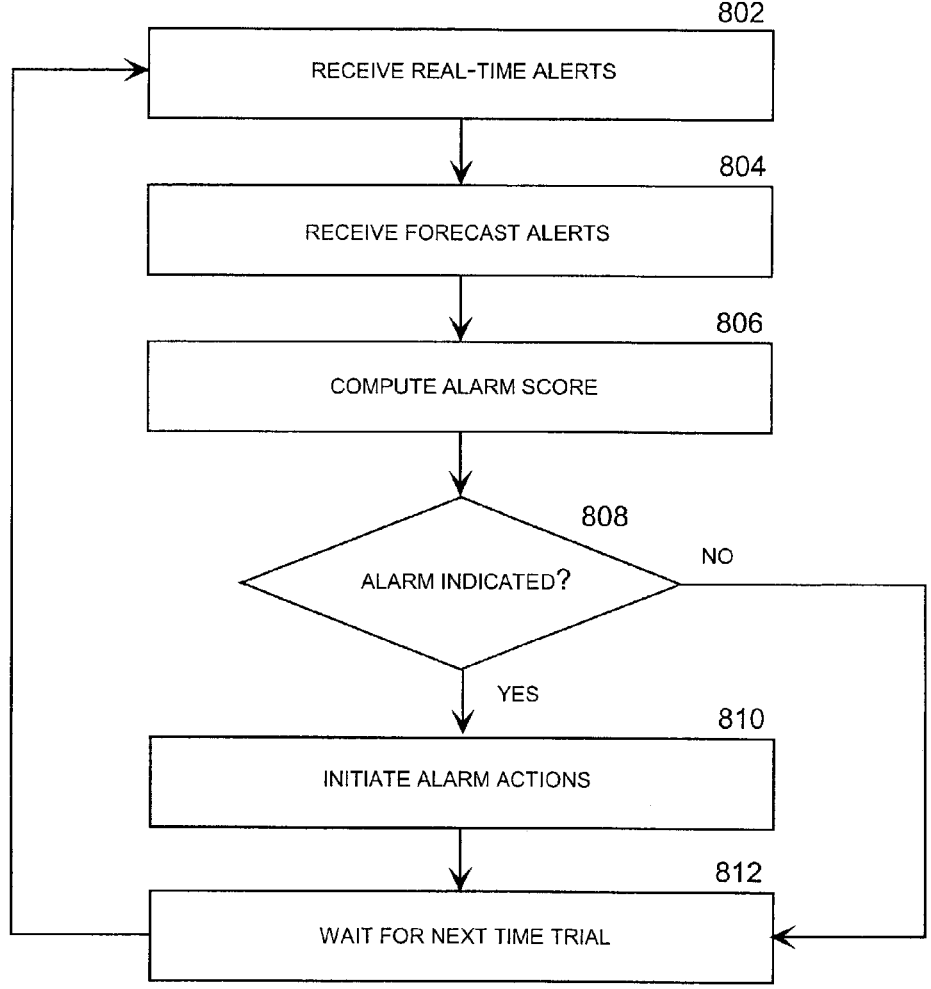
FIG. 8 is a logic flow diagram illustrating a routine for running an alarm generator component of the monitoring system.

FIG. 8 is a logic flow diagram illustrating a routine 800 for running the alarm generator 46. In step 802, the alarm generator 46 receives real-time alerts from the real-time alert detector 42. Step 802 is followed by step 804, in which the alarm generator 48 receives forecast alerts from the forecast alert detector 44. Step 804 is followed by step 806, in which the alarm generator 46 weights the alerts and computes an alarm score. Many different weighting and scoring methodologies will become apparent to those skilled in the art. In particular, it is desirable to make the specific weights and alert combinations user-defined parameters so that the user may tune this aspect of the monitoring function based on experience with the system.

Step 806 is followed by step 808, in which the forecast alarm generator 46 determines whether an alarm status is indicated based on the preceding alert scoring process. If an alarm status is indicated, the "YES" branch is followed to step 810, in which the alarm generator 46 activates an alarm condition, and may take additional actions, such as restarting a software application, rebooting a server, activating a back-up systems, rerouting network traffic, dropping non-essential or interruptible activities, transmitting e-mail alarms, and so forth. Step 810 is followed by step 812, in which the alarm generator 46 waits for the next time trial, at which time it loops to step 802 and repeats routine 800 for the next time trial. If an alert status is not indicated, the "NO" branch is followed from step 808 to step 810, in which the alarm generator 46 waits for the next time trial without activating an alarm condition. It should also be understood that for each time trial, routine 800 is typically repeated for each of several future time trials, and for each of several desired input variables, as desired.

In view of the foregoing, it will be appreciated that present invention greatly improves upon preexisting methods and systems for modeling, estimating, predicting and detecting abnormal behavior in computer networks that exhibit unpredictable abnormal events superimposed on top of rapidly fluctuating and continuously changing normally operational patterns. It should be understood that the foregoing relates only to the exemplary embodiments of the present invention, and that numerous changes may be made therein without departing from the spirit and scope of the invention as defined by the following claims.

The invention claimed is:

1. A method for analyzing and predicting the performance of a computer network, comprising the steps of continually receiving measurements defining signatures for a plurality of input variables reflecting performance of the computer network, each signature comprising a time series of measurements including historical measurements for past time trials and a current measurement for a current time trial, and for a selected input variable:
   receiving a current measurement for a current time for an input variable reflective of the performance of the computer network;
   defining a signature for the input variable comprising a time series of measurements for the selected input variable including historical measurements for past time trials and the current measurement for the current time trial;
   dividing the signature for the selected input variable into multiple iterations of a repeating cycle wherein each iteration comprises a portion of the signature having a similar number of measurements, dividing each iteration into a plurality of similar contiguous time index periods, and computing a cyclical component of the selected input variable reflecting data accumulated for each time index period across multiple iterations of the cycle;
   computing an erratic component of the selected input variable by removing at least the cyclical component from the signature;
   computing a time-based baseline mean for the erratic component of the selected input variable based on the historical measurements of the selected input variable;
   computing an imputed estimate for the erratic component of the selected input variable for the current time trial based on similarly computed erratic components for other input variables for the current time trial and learned parameters reflecting observed relationships between the erratic component for the selected input variable and the erratic components for the other input variables; and
   determining and displaying an alert status for the computer network based on the time-based baseline mean for the erratic component of the selected input variable and the imputed estimate of the erratic component of the input variable for the current time trial.

2. The method of claim 1, further comprising the step of updating the learned parameters and the time-based baseline mean for the selected input variable based on the measurement received for the selected input value for the current time trial.

3. The method of claim 2, further comprising the step of repeating the steps of claim 2 for the other input variables.

4. The method of claim 3, further comprising the step of continually repeating the steps of claim 3 for multiple time trials.

5. The method of claim 1, wherein the step of determining the alert status for the computer network comprises the step of comparing a confidence value associated with the imputed estimate to a threshold value.

6. The method of claim 5, wherein:
   the confidence value comprises a standard error associated with the imputed estimate; and
   the threshold value is based on a standard error of the erratic component and a user-defined configuration parameter.

7. The method of claim 1, wherein the step of computing the erratic component of the selected input variable further comprises the step of removing a seasonal component from the signature of the selected input variable.

8. The method of claim 1, wherein the step of computing the erratic component of the selected input variable further comprises the step of removing a global trend from the signature of the selected input variable.

9. The method of claim 2, wherein the step of updating the time-based baseline mean for the selected input variable comprises the step of:
   computing an updated baseline mean based on a weighted sum comprising the baseline mean for the selected input variable and the measurement for the current time trial for the selected input variable.

10. The method of claim 2, wherein the step of updating the time-based baseline mean for the selected input variable comprises the steps of:
   computing an updated time-based baseline mean for the cyclical component;
   computing an updated time-based baseline mean for the erratic component; and
   summing the time-based baseline means for the cyclical and the erratic components.

11. The method of claim 4, further comprising the steps of:
   receiving imputed estimate alerts corresponding to multiple input measurements;
   weighting the alerts;
   computing an alert score based on the weighted alerts; and
   determining whether to activate an alarm condition based on the alert score.

12. A computer storage medium storing computer-executable instruction for performing the method of claim 1.

13. An apparatus configured to perform the method of claim 1.

14. The method of claim 1, further comprising the step of computing a forecast estimate for the erratic component of the selected input variable for the future time trials based on similarly computed erratic components for other input variables for the current time trial and learned parameters reflecting observed relationships between the erratic component for the selected input variable and the erratic components for the other input variables; and wherein the step of determining the alert status for the computer network takes into consideration the forecast estimate of the erratic component.

15. A method for analyzing and predicting the performance of a computer network, comprising the steps of continually receiving measurements defining signatures for a plurality of input variables reflecting performance of the computer network, each signature comprising a time series of measurements including historical measurements for past time trials and a current measurement for a current time trial, and for a selected input variable:

receiving a current measurement for a current time for an input variable reflective of the performance of the computer network;

defining a signature for the input variable comprising a time series of measurements for the selected input variable including historical measurements for past time trials and the current measurement for the current time trial;

dividing the signature for the selected input variable into multiple iterations of a repeating cycle wherein each iteration comprises a portion of the signature having a similar number of measurements, dividing each iteration into a plurality of similar contiguous time index periods, and computing a cyclical component of the selected input variable reflecting data accumulated for each time index period across multiple iterations of the cycle;

computing an erratic component of the selected input variable by removing at least the cyclical component from the signature;

computing a time-based baseline mean for the erratic component of the selected input variable based on the historical measurements of the selected input variable;

computing a forecast estimate for the erratic component of the selected input variable for the future time trials based on similarly computed erratic components for other input variables for the current time trial and learned parameters reflecting observed relationships between the erratic component for the selected input variable and the erratic components for the other input variables; and determining and displaying an alert status for the computer network based on the time-based baseline mean for the erratic component of the selected input variable and the forecast estimate of the erratic component of the input variable for the current time trial.

16. The method of claim 15, further comprising the step of updating the learned parameters and the time-based baseline mean for the selected input variable based on the measurement received for the selected input value for the current time trial.

17. The method of claim 16, further comprising the step of repeating the steps of claim 16 for the other input variables.

18. The method of claim 17, further comprising the step of continually repeating the steps of claim 17 for multiple time trials.

19. The method of claim 18, further comprising the step of continually repeating the steps of claim 18 for multiple cyclical components.

20. The method of claim 16, wherein the step of determining the alert status for the computer network comprises the step of comparing the forecast estimate to a confidence value associated with the threshold value.

21. The method of claim 20, wherein the threshold value is based on the time-based baseline variance for the selected input variable and a user-defined configuration parameter.

22. The method of claim 15, wherein the step of computing the erratic component of the selected input variable further comprises the step of removing a seasonal component from the signature of the selected input variable.

23. The method of claim 15, wherein the step of computing the erratic component of the selected input variable further comprises the step of removing a global trend from the signature of the selected input variable.

24. The method of claim 16, wherein the step of updating the time-based baseline mean for the selected input variable comprises the step of:

computing an updated baseline mean based on a weighted sum comprising the baseline mean for the selected input variable and the measurement for the current time trial for the selected input variable.

25. The method of claim 16, wherein the step of updating the time-based baseline mean for the selected input variable comprises the steps of:

computing an updated time-based baseline mean for the cyclical component;

computing an updated time-based baseline mean for the erratic component; and summing the time-based baseline means for the cyclical and the erratic components.

26. The method of claim 15, further comprising the steps of:

receiving forecast estimate alerts corresponding to multiple input measurements;

weighting the alerts;

computing an alert score based on the weighted alerts; and determining whether to activate an alarm condition based on the alert score.

27. A computer storage medium storing computer-executable instruction for performing the method of claim 15.

28. An apparatus configured to perform the method of claim 15.

29. A method for analyzing and predicting the performance of a computer network characterized by a time-based signature, comprising the steps of:

(a) receiving a current measurement for a current time for an input variable reflective of the performance of the computer network;

(b) defining a signature for the input variable comprising a time series of measurements for the selected input variable including historical measurements for past time trials and the current measurement for the current time trial;

(c) determining a cyclical component associated with the time-based signature by dividing the signature for the selected input variable into multiple iterations of a repeating cycle wherein each iteration comprises a portion of the signature having a similar number of measurements, dividing each iteration into a plurality of similar contiguous time index periods, and computing a cyclical component of the selected input variable reflecting data accumulated for each time index period across multiple iterations of the cycle;

(d) computing an erratic component associated with the signature by removing at least the cyclical component from the signature;

(e) computing a forecast estimate of the erratic component based on a plurality of input variables reflected in the signature and a statistical model of the system comprising learned parameters reflecting observed relationships among the input variables;

(f) determining and displaying an alert status for the computer network based on an analysis of the erratic component;

(g) updating the learned parameters based on the inputs received the current time trial; and (h) repeating steps (a) through (g) for each of a plurality of successive time trials.

30. The method of claim 29, wherein the step of computing the erratic component associated with the signature further comprises the step of removing a seasonal component from the signature.

31. The method of claim 30, wherein the seasonal component and the cyclical component overlap each other in time.

32. The method of claim 29, further comprising the step of updating the alert status for each time trial.

33. The method of claim 32, wherein the step of determining the alert status for the forecast estimate comprises the steps of:
computing a confidence value for the forecast estimate;
computing a threshold value for the forecast estimate based on the confidence value;
computing a forecast estimate alert value reflecting a difference between the forecast estimate and the erratic component for the selected input variable to the threshold value for the forecast estimate; and
determining an alert status for the forecast estimate by comparing the alert value to the threshold value for the imputed estimate.

34. The method of claim 33, wherein:
the threshold value is based on a standard error of the erratic component and a user-defined configuration parameter.

35. The method of claim 32, wherein the step of determining the alert status for the forecast estimate comprises the steps of:
computing a threshold value for the forecast estimate; and
determining an alert status for the computer network by comparing the forecast estimate to the threshold value.

36. The method of claim 35, wherein the threshold value is based on a time-based baseline variance for the selected input variable and a user-defined configuration parameter.

37. The method of claim 36, further comprising the step of computing a time-based baseline mean and variance for the selected input variable by:

computing a mean and variance for the seasonal component, the cyclical component and the erratic component;
combining the means for the components to obtain the time-based baseline mean; and
combining the variances for the components to obtain the time-based baseline variance.

38. The method of claim 37, further comprising the step of updating the time-based baseline mean and variance for the selected input variable each trim trial.

39. The method of claim 38, wherein the step of updating the time-based baseline mean and variance for the selected input variable comprises the steps of:
computing an updated baseline mean based on a weighted sum comprising the baseline mean for the selected input variable and the measurement for the current time trial for the selected input variable; and
computing an updated baseline variance based on a weighted sum comprising the baseline variance for the selected input variable and the measurement for the current time trial for the selected input variable.

40. The method of claim 39, wherein the step of updating the time-based baseline mean and variance for the selected input variable comprises the steps of:
computing an updated time-based baseline mean by:
computing an updated mean for each component based on a weighted sum comprising the baseline mean for the component and the measurement received for the selected input variable for the current time trial, and
summing the updated means for the components; and
computing an updated time-based baseline variance by:
computing an updated variance for each component based on a weighted sum comprising the baseline variance for the component and the measurement received for the selected input variable for the current time trial, and
summing the updated variances for the components.

41. The method of claim 40, further comprising the steps of:
receiving imputed estimate and forecast estimate alerts corresponding to multiple input measurements;
weighting the alerts;
computing an alert score based on the weighted alerts; and
determining whether to activate an alarm condition based on the alert score.

42. A computer storage medium storing computer-executable instruction for performing the method of claim 29.

43. An apparatus configured to perform the method of claim 29.

* * * * *